US009648267B2

(12) United States Patent
Okamoto et al.

(10) Patent No.: US 9,648,267 B2
(45) Date of Patent: May 9, 2017

(54) IMAGE SENSOR AND CONTROL METHOD FOR IMAGE SENSOR

(71) Applicant: Sony Semiconductor Solutions Corporation, Kanagawa (JP)

(72) Inventors: Koichi Okamoto, Kanagawa (JP); Rei Yoshikawa, Kanagawa (JP); Hiroaki Ebihara, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/014,704

(22) Filed: Feb. 3, 2016

(65) Prior Publication Data
US 2016/0150172 A1    May 26, 2016

Related U.S. Application Data

(63) Continuation of application No. 14/395,386, filed as application No. PCT/JP2013/061891 on Apr. 23, 2013, now Pat. No. 9,288,411.

(30) Foreign Application Priority Data

May  1, 2012 (JP) ................................ 2012-104562
May 30, 2012 (JP) ................................ 2012-123077

(51) Int. Cl.
*H04N 5/378* (2011.01)
*H04N 5/369* (2011.01)
(Continued)

(52) U.S. Cl.
CPC ........... *H04N 5/378* (2013.01); *H04N 5/3537* (2013.01); *H04N 5/3698* (2013.01); *H04N 5/376* (2013.01);
(Continued)

(58) Field of Classification Search
CPC ............... H04N 5/3742; H04N 5/3698; H04N 5/37455; H04N 5/376; H04N 5/378; H04N 9/045; H04N 9/64
(Continued)

(56) References Cited

U.S. PATENT DOCUMENTS 6,469,289 B1 * 10/2002 Scott-Thomas ...... H04N 3/1512
250/208.1
2003/0169354 A1 * 9/2003 Aotsuka ................ H04N 5/335
348/272
(Continued)

FOREIGN PATENT DOCUMENTS

EP    2009-2093997    8/2009
JP    11-275466 A    10/1999
(Continued)

OTHER PUBLICATIONS

International Search Report; International Application No. PCT/JP2013/061891; Filed Date: Apr. 23, 2013. (Form PCT/ISA/210).
(Continued)

*Primary Examiner* — Nhan T Tran
(74) *Attorney, Agent, or Firm* — Michael Best & Friedrich LLP

(57) ABSTRACT

The present technology relates to an image sensor and a control method for an image sensor which are capable of measuring illuminance of each color in an image sensor. Each of a plurality of pixel units includes a pixel and a reset transistor, and the pixel includes a photoelectric converting unit that performs photoelectric conversion on light of a certain color incident through a color filter and a transfer transistor that transfers charges obtained by the photoelectric conversion of the photoelectric converting unit and is controllable for each color. According to control of the transfer transistor, the charges are read from the photoelectric converting unit through the transfer transistor and the reset
(Continued)

transistor, and a voltage corresponding to the charges is supplied to an AD converting unit connected to the reset transistor. The present technology can be applied to, for example, an image sensor that photographs an image.

20 Claims, 19 Drawing Sheets

(51) Int. Cl.
     *H04N 9/04*        (2006.01)
     *H04N 5/376*      (2011.01)
     *H04N 5/374*      (2011.01)
     *H04N 5/3745*     (2011.01)
     *H04N 9/64*        (2006.01)
     *H04N 5/353*      (2011.01)

(52) U.S. Cl.
     CPC ....... *H04N 5/3742* (2013.01); *H04N 5/37455* (2013.01); *H04N 5/37457* (2013.01); *H04N 9/045* (2013.01); *H04N 9/64* (2013.01)

(58) Field of Classification Search
     USPC ......... 348/308, 294, 297, 272, 273; 341/155
     See application file for complete search history.

(56) References Cited

U.S. PATENT DOCUMENTS

| | | |
|---|---|---|
| 2003/0197798 A1 | 10/2003 | Juen |
| 2009/0173974 A1 | 7/2009 | Shah et al. |
| 2009/0302359 A1* | 12/2009 | Chen .................... H04N 5/3456 257/292 |
| 2010/0110261 A1* | 5/2010 | Ito .......................... H04N 5/335 348/311 |

FOREIGN PATENT DOCUMENTS

| | | | | |
|---|---|---|---|---|
| JP | 2002-033881 A | | 1/2002 | |
| JP | 2005-175986 A | | 6/2005 | |
| JP | 2007-150808 A | | 6/2007 | |
| JP | 2008-079250 A | | 4/2008 | |
| JP | 2008079250 A | * | 4/2008 | ............ H04N 5/335 |
| JP | 2009-194633 A | | 8/2009 | |

OTHER PUBLICATIONS

Written Opinion of the International Searching Authority; International Application No. PCT/JP2013/061891; Dated: Jun. 18, 2013. (Form PCT/ISA/220 and PCT/ISA/237).

European Extended Search Report for Application No. 13784857.8 dated Aug. 12, 2015.

* cited by examiner

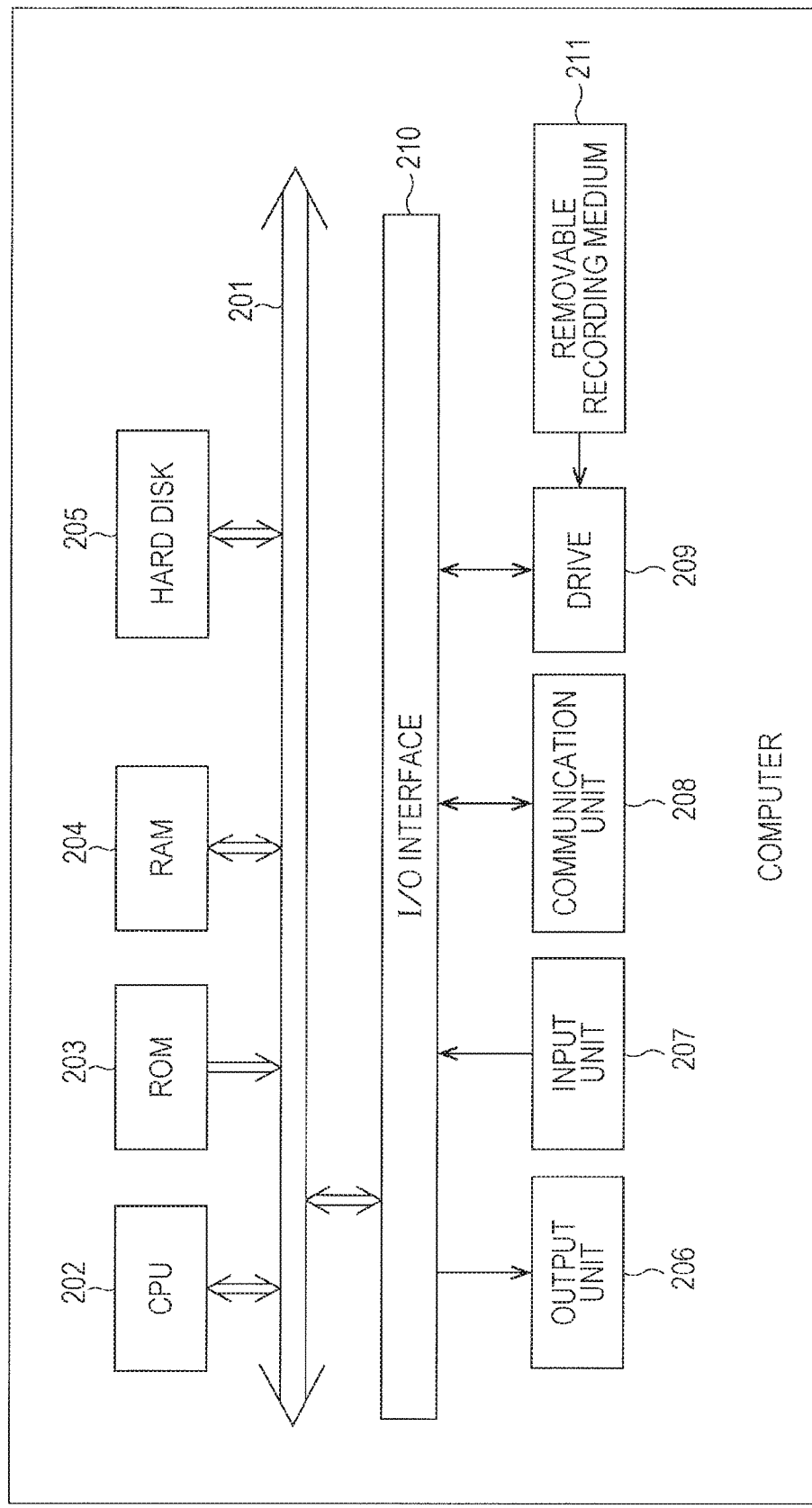

IMAGE SENSOR AND CONTROL METHOD FOR IMAGE SENSOR

CROSS REFERENCES TO RELATED APPLICATIONS

This is a Continuation of U.S. patent application Ser. No. 14/395,386, filed on Oct. 17, 2014, which is a National Stage of PCT/JP2013/061891, filed on Apr. 23, 2013, which claims priority from Japanese Patent Application JP 2012-104562 filed in the Japanese Patent Office on May 1, 2012, and Japanese Patent Application JP 2012-123077 filed in the Japanese Patent Office on May 30, 2012, the entire contents of which being incorporated herein by reference.

TECHNICAL FIELD

The present technology relates to an image sensor and a control method for an image sensor, and more particularly, to an image sensor and a control method for an image sensor, which are capable of measuring illuminance of each color without adding a circuit to a pixel regardless of whether or not pixels of a plurality of colors are shared in an image sensor.

BACKGROUND ART

As an image sensor that detects ambient light and measures illuminance without adding a circuit to a pixel, for example, there is a complementary metal oxide semiconductor (CMOS) image sensor proposed in Patent Document 1.

CITATION LIST

Patent Document
Patent Document 1: Japanese Patent Application Laid-Open No. 2002-33881

SUMMARY OF THE INVENTION

Problems to be Solved by the Invention

In the CMOS image sensor disclosed in Patent Document 1, when pixels of a plurality of colors are shared, it is difficult to measure illuminance of each color.

The present technology was made in light of the foregoing, and it is desirable to measure illuminance of each color without adding a circuit to a pixel regardless of whether or not pixels of a plurality of colors are shared in an image sensor.

Solutions to Problems

An image sensor according to an aspect of the present technology is an image sensor including a plurality of pixel units each of which includes a pixel and a reset transistor, wherein the pixel includes a photoelectric converting unit that performs photoelectric conversion on light of a certain color incident through a color filter and a transfer transistor that transfers charges obtained by the photoelectric conversion of the photoelectric converting unit and is controllable for each color, the reset transistor is connected to an analog to digital (AD) converting unit that performs AD conversion, and resets the charges, and according to control of the transfer transistor, the charges are read from the photoelectric converting unit through the transfer transistor and the reset transistor, and a voltage corresponding to the charges is supplied to the AD converting unit connected to the reset transistor.

A control method according to an aspect of the present technology is a control method for an image sensor including a plurality of pixel units each of which includes a pixel and a reset transistor, wherein the pixel includes a photoelectric converting unit that performs photoelectric conversion on light of a certain color incident through a color filter and a transfer transistor that transfers charges obtained by the photoelectric conversion of the photoelectric converting unit and is controllable for each color, and the reset transistor is connected to an analog to digital (AD) converting unit that performs AD conversion, and resets the charges, and the control method includes reading the charges from the photoelectric converting unit through the transfer transistor and the reset transistor and supplying a voltage corresponding to the charges to the AD converting unit connected to the reset transistor, according to control of the transfer transistor.

In the aspect of the present technology, a pixel unit includes a pixel and a reset transistor that resets charges, and the pixel includes a photoelectric converting unit that performs photoelectric conversion on light of a certain color incident through a color filter and a transfer transistor that is controllable for each color. The reset transistor is connected with an AD converting unit that performs AD conversion. Further, according to control of the transfer transistor, the charges are read from the photoelectric converting unit through the transfer transistor and the reset transistor, and a voltage corresponding to the charges is supplied to the AD converting unit connected to the reset transistor.

The image sensor may be an independent device or may be an internal block configuring a single device.

Effects of the Invention

According to an aspect of the present technology, it is possible to measure illuminance of each color in an image sensor. Particularly, it is possible to measure illuminance of each color without adding a circuit to a pixel regardless of whether or not pixels of a plurality of colors are shared in an image sensor.

BRIEF DESCRIPTION OF DRAWINGS

FIG. 19 is a block diagram illustrating an exemplary configuration of a computer according to an embodiment of the present technology.

MODE FOR CARRYING OUT THE INVENTION

Image Sensor According to Embodiment of Present Technology

Figure 1:
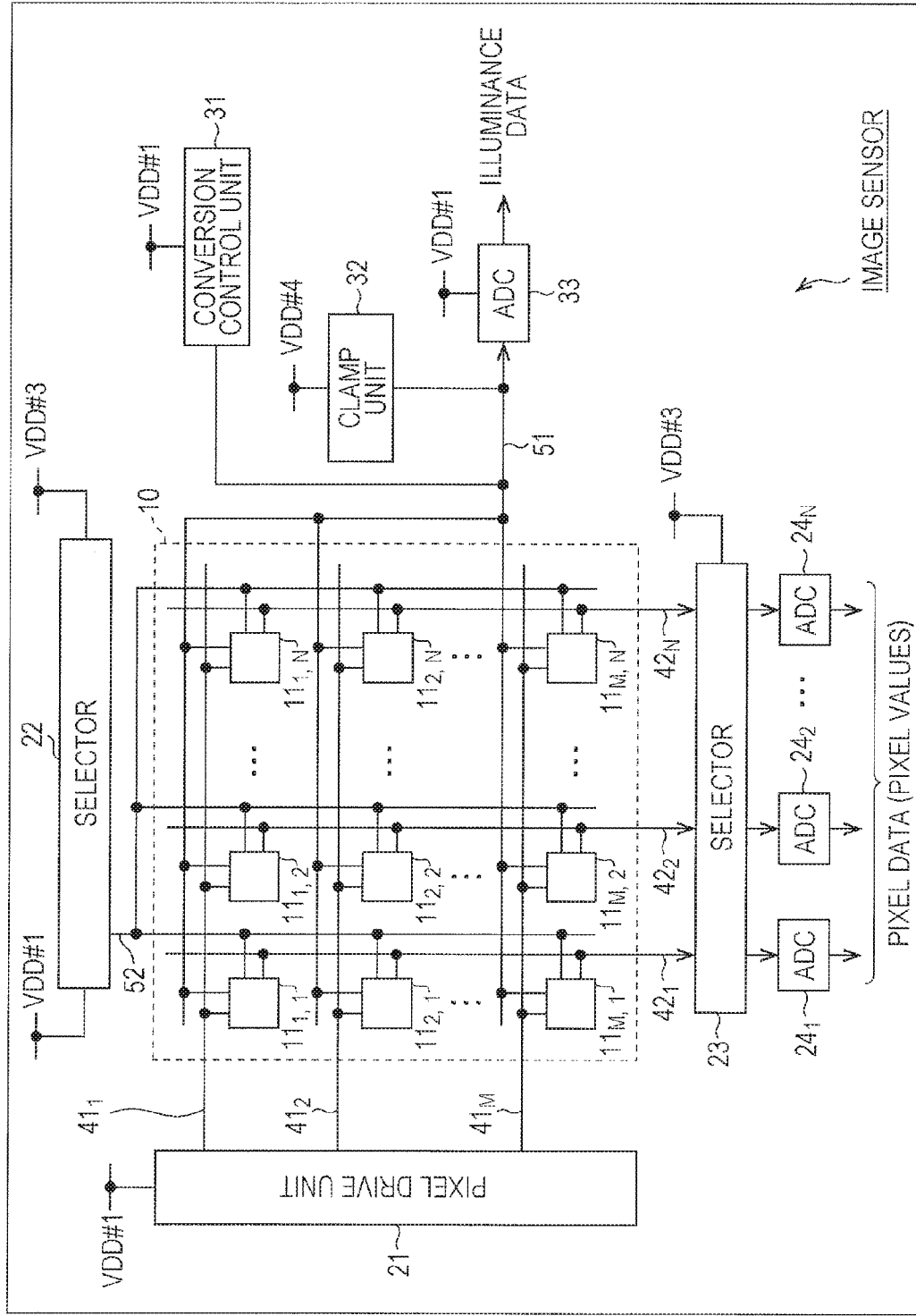
FIG. 1 is a block diagram illustrating an exemplary configuration of an image sensor according to an embodiment of the present technology.

FIG. 1 is a block diagram illustrating an exemplary configuration of an image sensor according to an embodiment of the present technology.

An image sensor of FIG. 1 is a CMOS sensor employed, for example, in a digital still camera or digital video camera, but the image sensor according to the present technology is not limited to a CMOS sensor.

The image sensor illustrated in FIG. 1 is, for example, a semiconductor chip of a single chip, and includes a pixel array 10, a pixel drive unit 21, selectors 22 and 23, analog to digital converters (ADCs) 24.sub.1 to 24.sub.N, a conversion control unit 31, a clamp unit 32, and an ADC 33.

The pixel array 10 includes M.times.N (M and N are integers of 1 or larger) pixel units 11.sub.1,1, 11.sub.1,2, . . . , 11.sub.1,N, 11.sub.2,1, 11.sub.2,2, . . . , 11.sub.2,N, . . . , 11.sub.M,1, 11.sub.M,2, . . . , and 11.sub.M,N.

The M.times.N pixel units 11.sub.1,1 to 11.sub.M,N are arranged in the form of an M.times.N matrix (lattice), and connected to power lines 51 and 52 supplying electric power.

A pixel control line 41.sub.m extending in a row direction (a horizontal direction) is connected to the N pixel units 11.sub.m,1 to 11.sub.m,N arranged in an m-th (m=1, 2, . . . , M) row (from the top) in the row direction.

A vertical signal line 42.sub.n extending in a column direction (a vertical direction) is connected to the M pixel units 11.sub.1,n to 11.sub.M,n arranged in an n-th (n=1, 2, . . . , N) line (from the left) in the column direction.

The pixel unit 11.sub.m,n includes a pixel which will be described later, and performs photoelectric conversion in the pixel. Further, the pixel unit 11.sub.m,n outputs (a voltage corresponding) charges obtained by the photoelectric conversion of the pixel according to control of the pixel drive unit 21 involving the pixel control line 41.sub.m.

The pixel of the pixel unit 11.sub.m,n performs photoelectric conversion on light of a certain color incident through, for example, a Bayer array color filter or the like.

Here, the color filter is not limited to the Bayer array color filter, and in the following description, the Bayer array color filter is assumed to be employed as the color filter.

In the Bayer array, for example, 4 pixels of 2.times.2 pixels arranged such that which R (Red) is arranged on an upper left, G (Green) is arranged on a lower right and a lower left, and B (Blue) is arranged on a lower right are used as a unit of the Bayer array, and the units of the Bayer array are repeatedly arranged in the row direction and the column direction.

Here, among the 4 pixels serving as the unit of the Bayer array, there are two Gs in view of human's visual characteristics, but hereinafter, among the two Gs, G (on the upper right in the unit of the Bayer array) adjacent to R is referred to as Gr, and G (on the lower left in the unit of the Bayer array) adjacent to B is referred to as Gb.

As the pixel included in the image sensor, there are a pixel (open pixel) to which external light is incident and a pixel (non-open pixel) to which external light is not incident, but the present technology will be described in connection with only an open pixel to which light is incident.

The pixel drive unit 21 controls the pixel units 11.sub.m,1 to 11.sub.m,N connected to the pixel control line 41.sub.m through the pixel control line 41.sub.m.

The pixel drive unit 21 operates by electric power supplied from a power source (analog power source) (hereinafter, also referred to as "power source VDD#1") of a voltage VDD#1. The power source VDD#1 serves as a main power source of the image sensor.

The selector 22 is connected to the power source (the power source VDD#1) of the voltage VDD#1 and a power source (a power source VDD#3) of a voltage VDD#3. The voltage VDD#3 is lower than the voltage VDD#1.

The selector 22 is connected with the power line 52 connected with the M.times.N pixel units 11.sub.1,1 to 11.sub.M,N.

The selector 22 selects one of the power sources VDD#1 and VDD#3 according to an operation mode of the image sensor, and connects the selected power source to the power line 52, so that a voltage (electric power) is supplied from one of the power sources VDD#1 and VDD#3 connected to the power line 52 to the pixel unit 11.sub.1,1 to 11.sub.M,N through the power line 52.

Here, in the present embodiment, as an operation mode of the image sensor, there are an imaging mode in which image photographing (normal photographing) is performed and an illuminometer mode in which the image sensor functions as an illuminance that measures illuminance.

The selector 22 selects the power source VDD#1 in the imaging mode, and selects the power source VDD#3 in the illuminometer mode.

For the operation mode of the image sensor, for example, an instruction may be given from the outside.

The selector 23 connected to the power source VDD#3 and the N ADCs 24.sub.1, 24.sub.2, . . . , and 24.sub.N.

The selector 23 is connected with a vertical signal line 41.sub.n connected with the M pixel units 11.sub.1,n to 11.sub.M,n arranged in the column direction.

The selector 23 selects one of the power source VDD#3 and the N ADCs 24.sub.1 to 24.sub.N according to the operation mode of the image sensor, and connects the selected one with the vertical signal lines 41.sub.1 to 41.sub.N.

In other words, in the photographing mode, the selector 23 selects the N ADCs 24.sub.1 to 24.sub.N, and connects the ADC 24.sub.n with the vertical signal line 41.sub.n. As a result, a voltage that corresponds to charges accumulated in the pixel and is output from the pixel of the pixel unit 11.sub.m,n to the vertical signal line 41.sub.n is supplied to the ADC 24.sub.n through the selector 23.

In the illuminometer mode, the selector 23 selects the power source VDD#3, and connects the power source VDD#3 with the vertical signal line 41.sub.1 to 41.sub.N.

The ADC 24.sub.n performs correlated double sampling (CDS) and AD conversion on a voltage supplied from the pixel of the pixel unit 11.sub.m,n through the vertical signal line 41.sub.n and the selector 23, and outputs digital data obtained as a result as a pixel value (pixel data) of a color of the pixel the pixel unit 11.sub.m,n.

The conversion control unit 31 is connected to the power source VDD#1 and the power line 51.

In the imaging mode, the conversion control unit 31 connects the power source VDD#1 with the power line 51, and thus (electric power) of the power source VDD#1 is supplied to the M.times.N pixel units 11.sub.1,1 to 11.sub.M,N connected to the power line 51.

In the illuminometer mode, the conversion control unit 31 causes the power line 51 to enter a floating state, allows charges accumulated in the pixel the pixel unit 11.sub.m,n connected to the power line 51 to flow to the power line 51 of the floating state, and performs voltage conversion of converting the charges into a corresponding voltage. The voltage obtained by the voltage conversion performed by the conversion control unit 31 is supplied to the ADC 33 (which will be described later) connected to the power line 51.

The clamp unit 32 is connected to a power source (a power source VDD#4) of the voltage VDD#4 and the power line 51, and clamps the power line 51 to the voltage VDD#4 in the illuminometer mode. The voltage VDD#4 is lower than the voltage VDD#1, but a magnitude relation with the voltage VDD#3 is not particularly limited. In the present embodiment, the voltage VDD#3 is assumed to be equal to the voltage VDD#4.

The ADC 33 is connected to the power line 51. The ADC 33 operates by electric power supplied from the power source VDD#1, and in the illuminometer mode, the ADC 33 performs CDS and AD conversion on a voltage that corresponds to charges accumulated in the pixel of the pixel unit 11.sub.m,n and is supplied through the power line 51. Then, the ADC 33 outputs digital data obtained as a result of performing the CDS and the AD conversion as illuminance data representing illuminance of ambient light.

[Exemplary Configuration of Pixel Unit 11.Sub.m,n]

Figure 2:
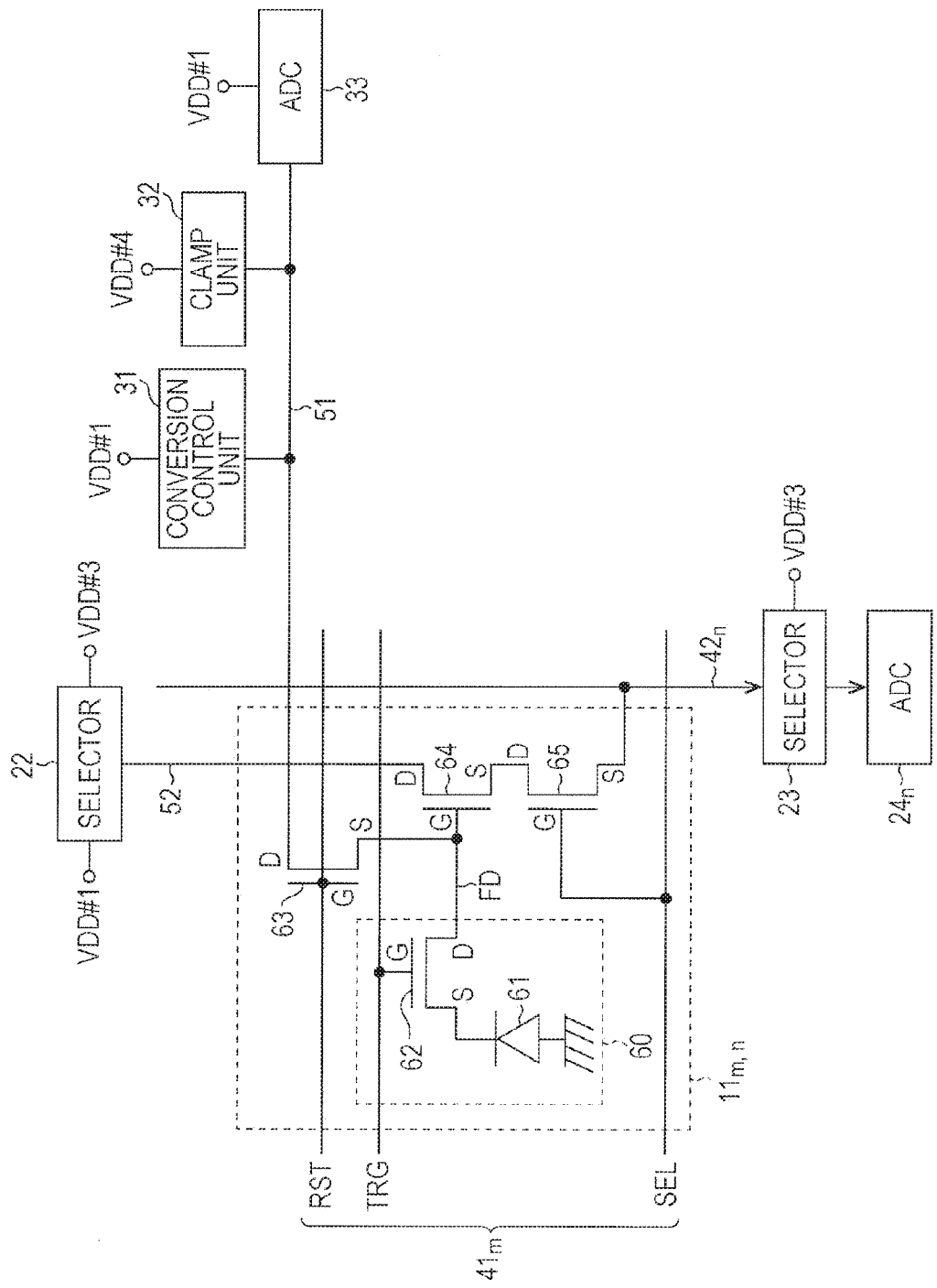
FIG. 2 is a circuit diagram illustrating an exemplary configuration of a pixel unit 11.sub.m,n.

FIG. 2 is a circuit diagram illustrating an exemplary configuration of the pixel unit 11.sub.m,n of FIG. 1.

Referring to FIG. 2, the pixel unit 11.sub.m,n includes one pixel 60 and a reset transistor 63, an amplifying transistor 64, and a selecting transistor 65 that are, for example, negative channel MOS (nMOS) field effect transistors (FET).

The pixel 60 includes a photo diode (PD) 61 and a transfer transistor 62.

Here, the pixel control line 41.sub.m connected to the pixel drive unit 21 (FIG. 1) includes a control line RST for controlling the reset transistor 63, a control line TRG for controlling the transfer transistor 62, and a control line SEL for controlling the selecting transistor 65.

The control line RST is connected to a gate of the reset transistor 63, and the control line TRG is connected to a gate of the transfer transistor 62. The control line SEL is connected to a gate of the selecting transistor 65.

Hereinafter, a control signal that flows through the control line RST to control the reset transistor 63 is also referred to as a control signal RST. Similarly, a control signal that flows through the control line TRG to control the transfer transistor 62 is also referred to as a control signal TRG, and a control signal that flows through the control line SEL to control the selecting transistor 65 is also referred to as a control signal SEL.

In the pixel 60, an anode of the PD 61 is connected to a GND (ground), and a cathode thereof is connected to, for example, a source of the transfer transistor 62.

The transfer transistor 62 is, for example, an nMOS FET, and a drain thereof is connected to a gate of the amplifying transistor 64.

A source of the reset transistor 63 is connected to a drain of the transfer transistor 62, and a drain of the reset transistor 63 is connected to the power line 51.

A drain of the amplifying transistor 64 is connected to the power line 52, and a source of the amplifying transistor 64 is connected to a drain of the selecting transistor 65.

The source of the selecting transistor 65 is connected to the vertical signal line 42.sub.n.

Figure 3:
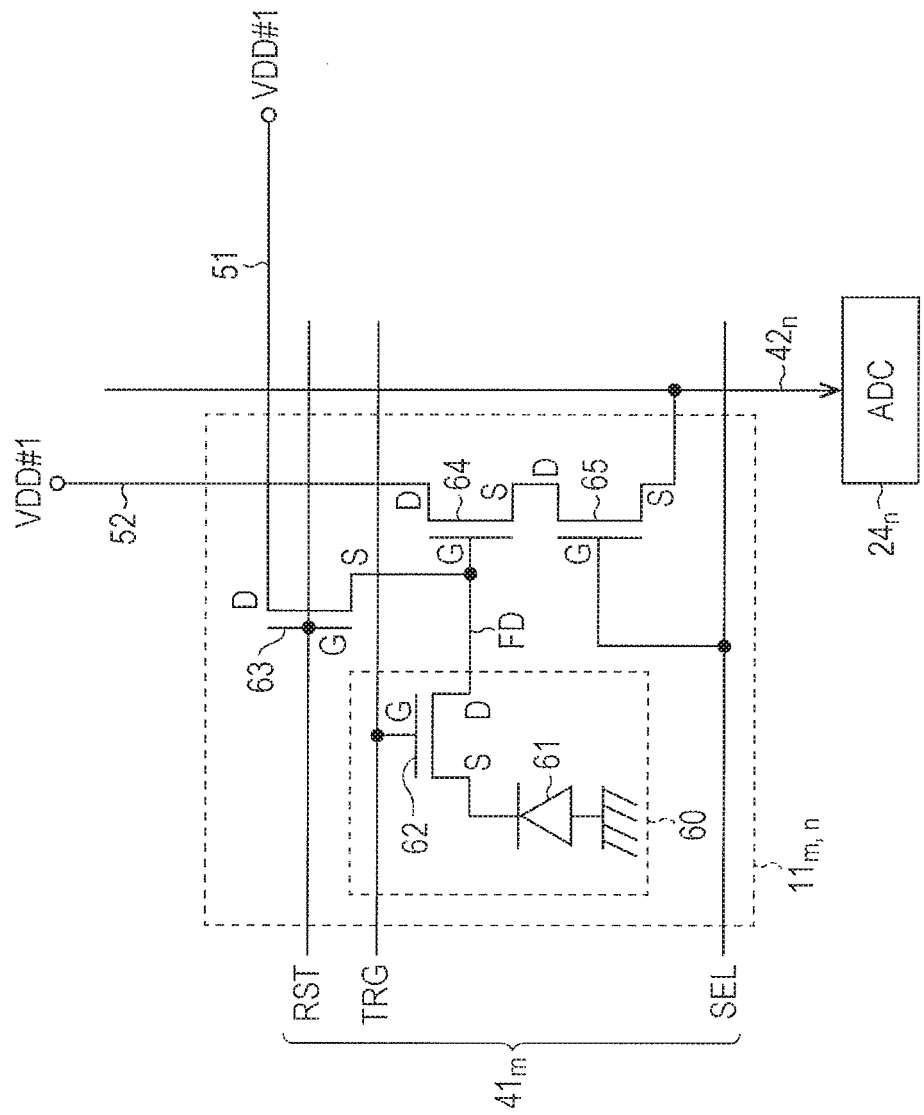
FIG. 3 is a diagram illustrating a state of a pixel unit 11.sub.m,n in an imaging mode.

FIG. 3 is a diagram illustrating a state of the pixel unit 11.sub.m,n in the imaging mode.

In the imaging mode, the selector 22 selects the power source VDD#1, and connects the power source VDD#1 with the power line 52.

Thus, the voltage VDD#1 is applied to the drain of the amplifying transistor 64 through the power line 52.

Further, in the photographing mode, the conversion control unit 31 connects the power source VDD#1 with the power line 51, and thus the voltage VDD#1 is applied to the drain of the reset transistor 63 through the power line 51. Here, although the same voltage VDD#1 is applied to the drain of the reset transistor 63 and the drain of the amplifying transistor 64, in the photographing mode, a voltage applied to the drain of the reset transistor 63 may not be equal to a voltage applied to the drain of the amplifying transistor 64. In other words, for example, the voltage VDD#1 may be applied to the drain of the amplifying transistor 64, and a voltage that is obtained by increasing the voltage VDD#1 and higher than the voltage VDD#1 may be applied to the drain of the reset transistor 63.

Further, in the photographing mode, the selector 23 selects the ADC 24.sub.n, and connects the ADC 24.sub.n with the vertical signal line 42.sub.n.

In the pixel 60, the PD 61 receives light of a color incident thereon, performs photoelectric conversion, and accumulates charges according to a quantity of received light.

The transfer transistor 62 temporarily enters the on state as a pulse temporarily transitioning from an L (Low) level to an H (High) level is applied to the gate thereof as the control signal TRG.

When the transfer transistor 62 enters the on state, the charges accumulated in the PD 61 are transferred from the source of the transfer transistor 62 to the drain thereof.

Here, the drain of the transfer transistor 62 is connected to the gate of the amplifying transistor 64, and this connection point is called a floating diffusion (FD). Thus, the charges accumulated in the PD 61 are transferred to the FD through the transfer transistor 62.

The reset transistor 63 temporarily enters the on state as the pulse temporarily transitioning from the L level to the H level is applied to the gate thereof as the control signal RST.

The reset transistor 63 enters the on state immediately before the transfer transistor 62 enters the on state, and the charges in the FD are swept out to the power source VDD#1 through the reset transistor 63 and the power line 51 and reset before the charges are transferred from the PD 61 to the FD.

The amplifying transistor 64 operates using the voltage VDD#1 applied to the drain thereof as a power source through the power line 52.

In other words, the amplifying transistor 64 outputs potential (voltage) of the FD immediately after the reset as a reset level to the source thereof, and then outputs the potential of the FD immediately after the charges are transferred from the PD 61 to the source thereof as a voltage (signal level) corresponding to a pixel value based on the reset level.

The selecting transistor 65 temporarily enters the on state as the pulse temporarily transitioning from the L level to the H level is applied to the gate thereof as the control signal SEL.

As described above, the drain of the selecting transistor 65 is connected to the source of the amplifying transistor 64, and the selecting transistor 65 outputs the reset level and the signal level output to (detected at) the source of the amplifying transistor 64 to the vertical signal line 42.sub.n connected to the source of the selecting transistor 65.

The reset level and the signal level output to the vertical signal line 42.sub.n are supplied to the ADC 24.sub.n. The ADC 24.sub.n performs the CDS and the AD conversion on the signal level using the reset level, and outputs digital data obtained as a result of performing the CDS and the AD conversion on the signal level as pixel data.

Figure 4:
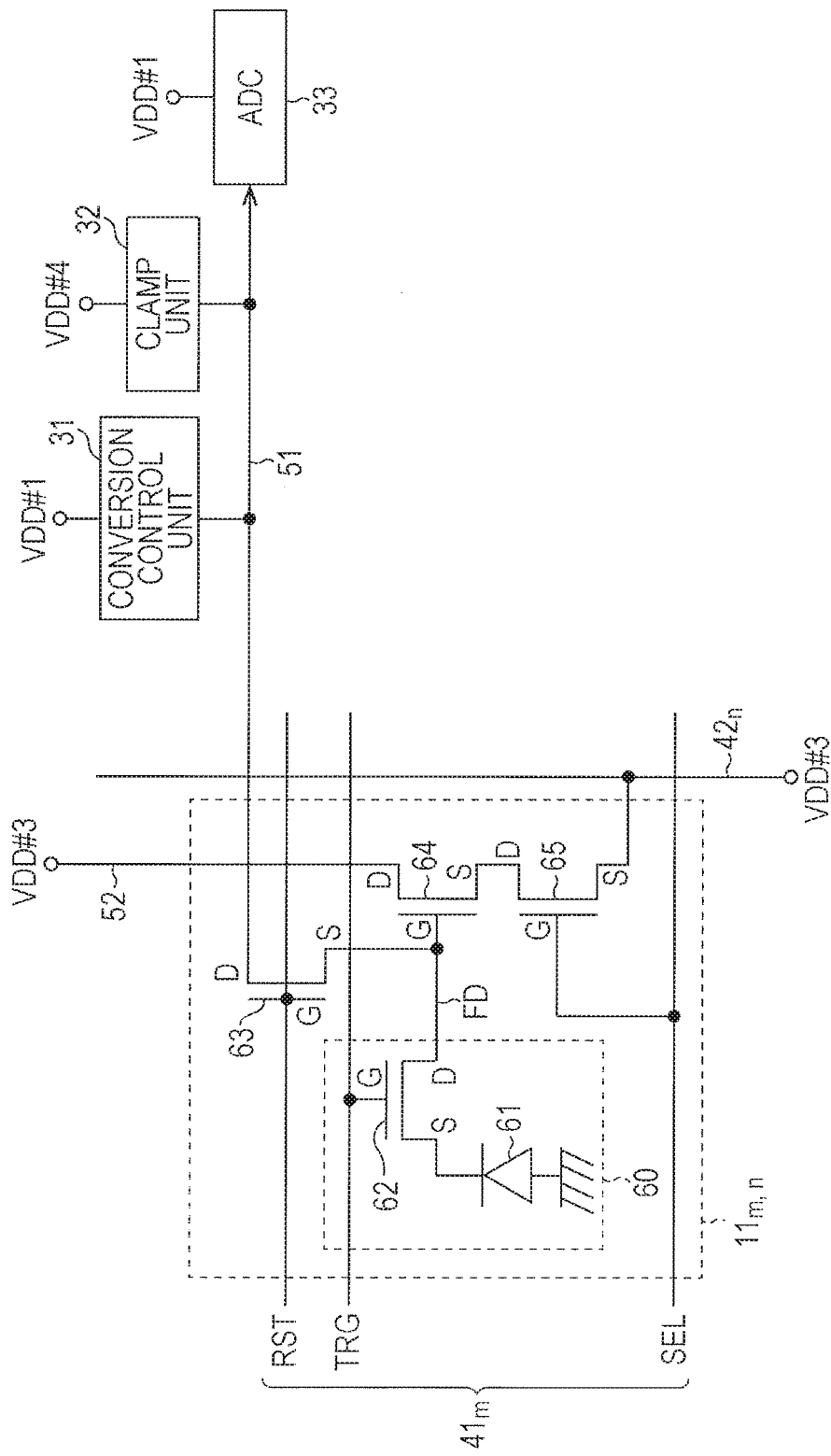
FIG. 4 is a diagram illustrating a state of a pixel unit 11.sub.m,n in an illuminometer mode.

FIG. 4 is a diagram illustrating a state of the pixel unit 11.sub.m,n in the illuminometer mode.

In the illuminometer mode, the selector 22 selects the power source VDD#3, and connects the power source VDD#3 with the power line 52.

Thus, the voltage VDD#3 is applied to the drain of the amplifying transistor 64 through the power line 52.

Further, in the illuminometer mode, the conversion control unit 31 causes the power line 51 to temporarily enter the floating state.

Furthermore, in the illuminometer mode, the selector 23 selects the power source VDD#3, and connects the power source VDD#3 with the vertical signal line 42.sub.n.

Thus, the voltage VDD#3 is applied to the source of the selecting transistor 65 connected to the vertical signal line 42.sub.n.

As a result, the same voltage VDD#3 is applied to the drain of the amplifying transistor 64 and the source of the selecting transistor 65.

Further, since the source of the amplifying transistor 64 is connected with the drain of the selecting transistor 65, the amplifying transistor 64 and the selecting transistor 65 enter a non-functional state.

Furthermore, since the amplifying transistor 64 and the selecting transistor 65 enters the non-functional state as the same voltage is applied to the drain of the amplifying transistor 64 and the source of the selecting transistor 65, it is possible to cause the amplifying transistor 64 and the selecting transistor 65 to enter the non-functional state even when the voltage VDD#1 higher than the voltage VDD#3 is applied instead of the voltage VDD#3 to the drain of the amplifying transistor 64 and the source of the selecting transistor 65.

However, when a high voltage is applied to the drain of the amplifying transistor 64 and the source of the selecting transistor 65, the capacity of the gate of the amplifying transistor 64 changes, and the change in the capacity may affect the voltage of the power line 51 through the reset transistor 63.

In this regard, according to the present embodiment, in the illuminometer mode, the voltage VDD#3 lower than the voltage VDD#1 is applied to the drain of the amplifying transistor 64 and the source of the selecting transistor 65.

In the illuminometer mode, the control signals RST and SEL constantly have the H level, and thus the reset transistor 63, and the selecting transistor 65 is constantly in the on state.

Further, the transfer transistor 62 temporarily enters the on state as the pulse temporarily transitioning from the L level to the H level is applied to the gate as the control signal TRG.

In the illuminometer mode, the reset transistor 63 is constantly in the on state, and thus when the transfer transistor 62 enters the on state, the charges accumulated in the PD 61 are swept out to (the power source VDD#2 (which will be described later) of) the conversion control unit 31 through the transfer transistor 62, the reset transistor 63, and the power line 51, and thus the PD 61 is reset.

Then, the voltage of the power line 51 when the PD 61 is reset is supplied to the ADC 33 connected to the power line 51 as the reset level.

Thereafter, the transfer transistor 62 temporarily enters the on state again as the pulse temporarily transitioning from the L level to the H level is applied to the gate thereof as the control signal TRG.

Further, the conversion control unit 31 causes the power line 51 to enter the floating state immediately before the transfer transistor 62 enters the on state again.

After the power line 51 enters the floating state, when the transfer transistor 62 enters the on state, the charges accumulated in the PD 61 flow to the power line 51 through the transfer transistor 62 and the reset transistor 63, and are converted into a corresponding voltage.

As a result, a voltage corresponding to the charges accumulated in the PD 61, that is, a voltage (signal level) corresponding to the illuminance based on the reset level is supplied to the ADC 33 connected to the power line 51.

The ADC 33 performs the CDS and the AD conversion on the signal level supplied through the power line 51 using the reset level supplied through the power line 51, and outputs digital data obtained as a result of performing the CDS and the AD conversion on the signal level as illuminance data.

Here, in the illuminometer mode, as the pixel in which the control signal TRG temporarily transitioning from the L level to the H level is applied to the transfer transistor 62 is selected, charges accumulated in all in (the PDs 61 of) the pixels 60 of the M.times.N pixel units 11.sub.1,1 to 11.sub.M,N or charges accumulated in some pixels 60 such as R and G pixels (either or both of Gr and Gb pixels) or B pixels (pixels receiving light of R, G, or B) flow to the power line 51, and thus a corresponding voltage can be supplied to the ADC 33.

Thus, the control signal TRG temporarily transitioning from the L level to the H level is applied to the transfer transistors 62 of all the pixels 60 of the M.times.N pixel units 11.sub.1,1 to 11.sub.M,N, illuminance data independent of a color can be obtained.

Further, as the control signal TRG temporarily transitioning from the L level to the H level is applied to the transfer transistors 62 of the R, G or B pixels among the pixels 60 of the M.times.N pixel units 11.sub.1,1 to 11.sub.M,N, illuminance of each color, that is, illuminance data of light of R, G, or B can be obtained.

[Exemplary Configuration of Conversion Control Unit 31]

Figure 5:
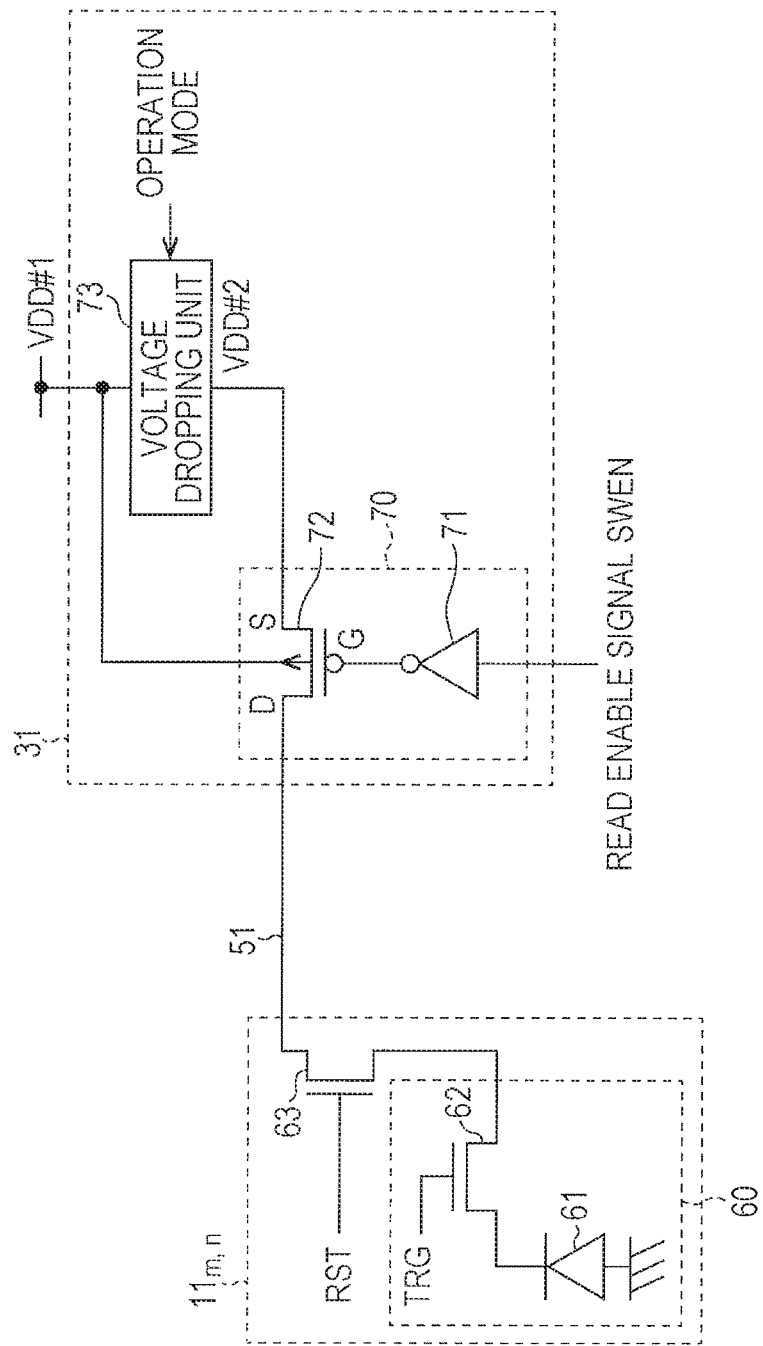
FIG. 5 is a block diagram illustrating an exemplary configuration of a conversion control unit 31.

FIG. 5 is a block diagram illustrating an exemplary configuration the conversion control unit 31.

FIG. 5 illustrates the pixel unit 11.sub.m,n as well as the conversion control unit 31, but does not illustrate the amplifying transistor 64 and the selecting transistor 65 in the pixel unit 11.sub.m,n.

The conversion control unit 31 includes a switch unit 70 and a voltage step-down unit 73.

The switch unit 70 is turned on or off according to a read enable signal SWEN (applied from a control unit (not illustrated), for example) supplied from the outside, and connects or disconnects the power line 51 and the voltage step-down unit 73.

Referring to FIG. 5, the switch unit 70 includes an inverter 71 and an FET 72.

The enable signal SWEN is input to the inverter 72. The inverter 72 inverts the enable signal SWEN input thereto, and applies the inverted enable signal SWEN to a gate of the FET 72.

The FET 72 is a positive channel MOS (pMOS) FET, and includes a drain connected to the power line 51 and a source connected to the voltage step-down unit 73.

A substrate of the FET 72 is connected to the power source VDD#1.

The voltage VDD#1 is applied to the voltage step-down unit 72. Depending on the operation mode, the voltage step-down unit 72 steps the voltage VDD#1 down to a voltage (stepped-down voltage) VDD#2 lower than the voltage VDD#1 or supplies the voltage VDD#1 to (FET 72 of) the switch unit 70 without stepping the voltage VDD#1 down.

In other words, in the imaging mode, the voltage step-down unit 72 supplies the voltage VDD#1 to the switch unit 70 without stepping the voltage VDD#1 down. Further, in the illuminometer mode, the voltage step-down unit 72 steps the voltage VDD#1 down to the voltage VDD#2, and supplies the voltage VDD#2 to the switch unit 70.

Thus, when the voltage step-down unit 73 is seen from (the power line 51 side further than) the switch unit 70, the voltage step-down unit 73 functions as the power source of the voltage VDD#1 or the power source of the voltage VDD#2 (power source #2).

Further, the voltage VDD#4 (the voltage VDD#3 equal to the voltage VDD#4 in the present embodiment) at which the clamp unit 32 (FIG. 1) clamps the power line 51 is a certain voltage lower than the voltage VDD#2.

In the conversion control unit 31 having the above configuration, in the imaging mode, the read enable signal SWEN of the H level is constantly supplied to the inverter 71.

In this case, an output of the inverter 71 has the L level, the L level is applied to the gate of the FET 72, and thus the FET 72 enters the on state.

In the imaging mode, as described above, the voltage step-down unit 72 supplies the voltage VDD#1 to the switch unit 70 without stepping the voltage VDD#1 down. Thus, the voltage VDD#1 supplied to the switch unit 70 is applied to the power line 51 through the FET 72 in the on state, and thus the voltage VDD#1 serving as the power source is applied to the drain of the reset transistor 63 through the power line 51.

Meanwhile, in the illuminometer mode, as described above, the voltage step-down unit 72 steps the voltage VDD#1 down to the voltage VDD#2, and supplies the voltage VDD#2 to the switch unit 70.

Further, in the illuminometer mode, the read enable signal SWEN has the H level at an initial stage and then has the L level.

Thus, in the illuminometer mode, while the read enable signal SWEN of the H level is being supplied to the inverter 71, the output of the inverter 71 has the L level, the L level is applied to the gate of the FET 72, and thus the FET 72 enters the on state.

When the FET 72 is in the on state, the voltage VDD#2 supplied to the switch unit 70 is applied to the power line 51 through the FET 72 in the on state.

Thereafter, when the read enable signal SWEN transitions to the L level, the output of the inverter 71 has the H level, the H level is applied to the gate of the FET 72, and thus the FET 72 enters the off state.

When the FET 72 is in the off state, the voltage VDD#2 supplied to the switch unit 70 is not applied to the power line 51. Then, due to the off state of the FET 72, the power line 51 connected to the FET 72 enters the floating state.

[Operation of Image Sensor in Illuminometer Mode]

Figure 6:
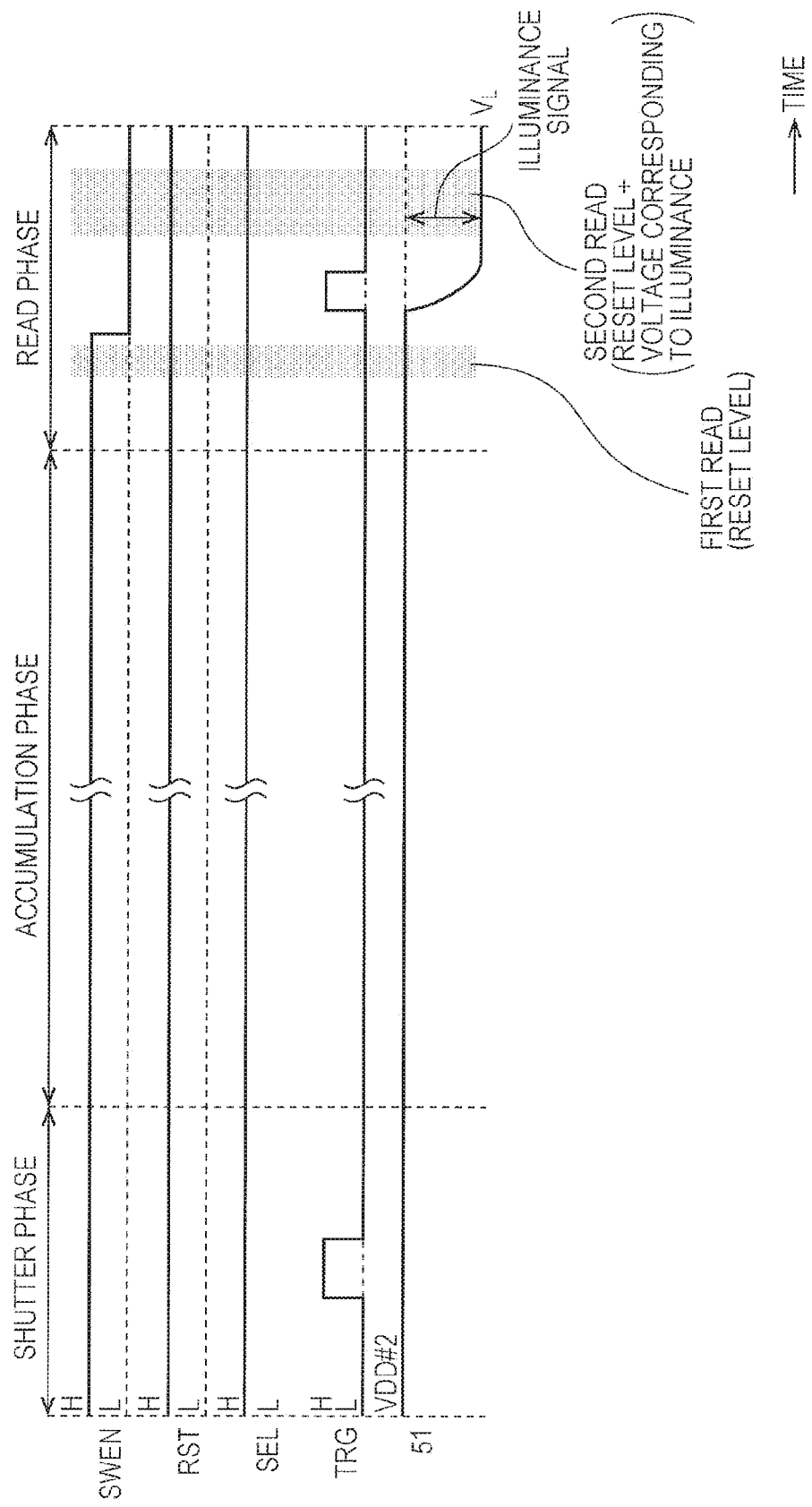
FIG. 6 is a timing chart for describing an operation of an image sensor in an illuminometer mode.

FIG. 6 is a timing chart for describing an operation of the image sensor in the illuminometer mode.

In other words, FIG. 6 illustrates the read enable signal SWEN the control signals RST, SEL, and TRG, and the voltage of the power line 51 in the illuminometer mode.

In the illuminometer mode, a process of obtaining the illuminance data chronologically includes a shutter phase, an accumulation phase, and a read phase.

In the illuminometer mode, the control signals RST and SEL have the H level in all of the shutter phase, the accumulation phase, and the read phase, and thus the reset transistor 63 and the selecting transistor 65 are constantly in the on state.

In the shutter phase, the read enable signal SWEN transitions to the H level, and the control signal TRG temporarily transitions from the L level to the H level.

In the shutter phase, as the read enable signal SWEN transitions to the H level, the FET 72 (FIG. 5) enters the on state, the voltage VDD#2 stepped down by the voltage step-down unit 73 is applied to the power line 51. In other words, the power source VDD#2 is connected to the power line 51.

Further, in the shutter phase, the control signal TRG temporarily transitions from the L level to the H level, and thus the transfer transistor 62 supplied with the control signal TRG temporarily enters the on state.

In the illuminometer mode, since the reset transistor 63 is constantly in the on state, in the shutter phase, when the transfer transistor 62 enters the on state, the charges accumulated in the PD 61 are swept out to the power source VDD#2 of the conversion control unit 31 connected to the power line 51 through the transfer transistor 62, the reset transistor 63, and the power line 51, and thus the PD 61 is reset.

Then, the voltage of the power line 51 when the PD 61 is reset becomes the voltage VDD#2 that is the voltage of the power source VDD#2 connected to the power line 51, and the voltage VDD#2 is supplied to the ADC 33 connected to the power line 51 as the reset level.

In the accumulation phase after the shutter phase, the read enable signal SWEN maintains the H level, and the control signal TRG maintains the L level without change.

Since the read enable signal SWEN has the H level, the FET 72 (FIG. 5) enters the on state, and similarly to the shutter phase, the power source VDD#2 obtained by stepping the voltage VDD#1 down through the voltage step-down unit 73 (FIG. 5) is connected to the power line 51.

Thus, the voltage of the power line 51 is the voltage VDD#2, similarly to the shutter phase, and the voltage VDD#2 is supplied to the ADC 33 connected to the power line 51 as the reset level.

Further, since the control signal TRG has the L level, the transfer transistor 62 enters the off state, and thus charges are accumulated in the PD 61.

In the read phase after the accumulation phase, the read enable signal SWEN transitions from the H level to the L level, and the control signal TRG temporarily transitions from the L level to the H level immediately after the read enable signal SWEN transitions from the H level to the L level.

Then, in the read phase, immediately before the read enable signal SWEN transitions from the H level to the L level, the ADC 33 performs a first read operation of reading the voltage of the power line 51, and acquires the voltage of the power line 51 as the reset level as indicated by a shadow in FIG. 6.

Here, immediately before the read enable signal SWEN transitions from the H level to the L level, since the FET 72 (FIG. 5) is in the on state and the power source #2 is connected to the power line 51, the voltage VDD#2 is acquired as the reset level by the first read operation of reading the voltage of the power line 51 through the ADC 33.

Thereafter, in the read phase, after the read enable signal SWEN transitions from the H level to the L level, and the control signal TRG temporarily transitions from the L level to the H level and then transitions to the L level, the ADC 33 performs a second read operation of reading the voltage of the power line 51, and acquires the voltage of the power line 51 a voltage (signal level) corresponding to illuminance based on the reset level as indicated by a shadow in FIG. 6.

Here, as the read enable signal SWEN transitions from the H level to the L level, the FET 72 (FIG. 5) enters the off state. As a result, the power line 51 enters the floating state.

Further, as the control signal TRG temporarily transitions from the L level to the H level, and the transfer transistor 62 supplied with the control signal TRG through the gate temporarily enters the on state.

When the transfer transistor 62 enters the on state, the charges accumulated in the PD 61 in the accumulation phase (accurately, until the control signal TRG transitions to the H level in the read phase after the control signal TRG transitions to the L level in the shutter phase) flow to the power line 51 through the transfer transistor 62 and the reset transistor 63, and are converted into a corresponding voltage.

As a result, the voltage of the power line 51 in the floating state changes (drops) from the immediately previous voltage VDD#2 by the voltage (illuminance signal) corresponding to the charges accumulated in the PD 61, and in the second read operation of reading the voltage of the power line 51 through the ADC 33, the changed voltage is acquired as the signal level (the voltage corresponding to the illuminance based on the reset level).

The ADC 33 performs the CDS and the AD conversion on the signal level that is the voltage of the power line 51 acquired by the second read operation using the reset level that is the voltage of the power line 51 (the voltage VDD#2) acquired by the first read operation, and outputs the digital data obtained as a result of performing the CDS and the AD conversion on the signal level as the illuminance data.

Here, in the image sensor of FIG. 1, in the illuminometer mode, the pixel drive unit 21 (FIG. 1) simultaneously supplies the control signals RST and SEL all the pixel unit 11.sub.1,n to 11.sub.M,n of the M rows, and causes the reset transistor 63 and the selecting transistor 65 to simultaneously enter the on state.

Further, the pixel drive unit 21 can supply the control signal TRG to the transfer transistors 62 of the pixels 60 of the M.times.N pixel units 11.sub.1,1 to 11.sub.M,N for each color of light received by the pixels 60 and control the transfer transistors 62 of the pixels 60 for each color.

In the shutter phase and the read phase, as the pixel drive unit 21 simultaneously supplies the control signal TRG temporarily transitioning from the L level to the H level to the transfer transistors 62 of all the pixels 60 of the M.times.N pixel units 11.sub.1,1 to 11.sub.M,N, that is, causes the transfer transistors 62 of all the pixels 60 of the M.times.N pixel units 11.sub.1,1 to 11.sub.M,N to simultaneously enter the on state temporarily, the ADC 33 can obtain illuminance data (illuminance data obtained by adding light of respective colors) of light received by all the pixels 60 of the M.times.N pixel units 11.sub.1,1 to 11.sub.M,N, which is independent of a color.

Further, in the shutter phase and the read phase, as the pixel drive unit 21 supplies the control signal TRG temporarily transitioning from the L level to the H level to the transfer transistors 62 of, for example, the R pixels 60, the G pixels 60, and the B pixels 60 among the pixels 60 of the M.times.N pixel units 11.sub.1,1 to 11.sub.M,N at individual timings, that is, causes the transfer transistors 62 of, for example, the R pixels 60, the G pixels 60, and the B pixels 60 to temporarily enter the on state at individual timings (controls the transfer transistor 62 for each color received by the pixel 60), the ADC 33 can obtain illuminance data for each color of R, G, and B of light received by the R pixels 60, the G pixels 60, and the B pixels 60.

Figure 7:
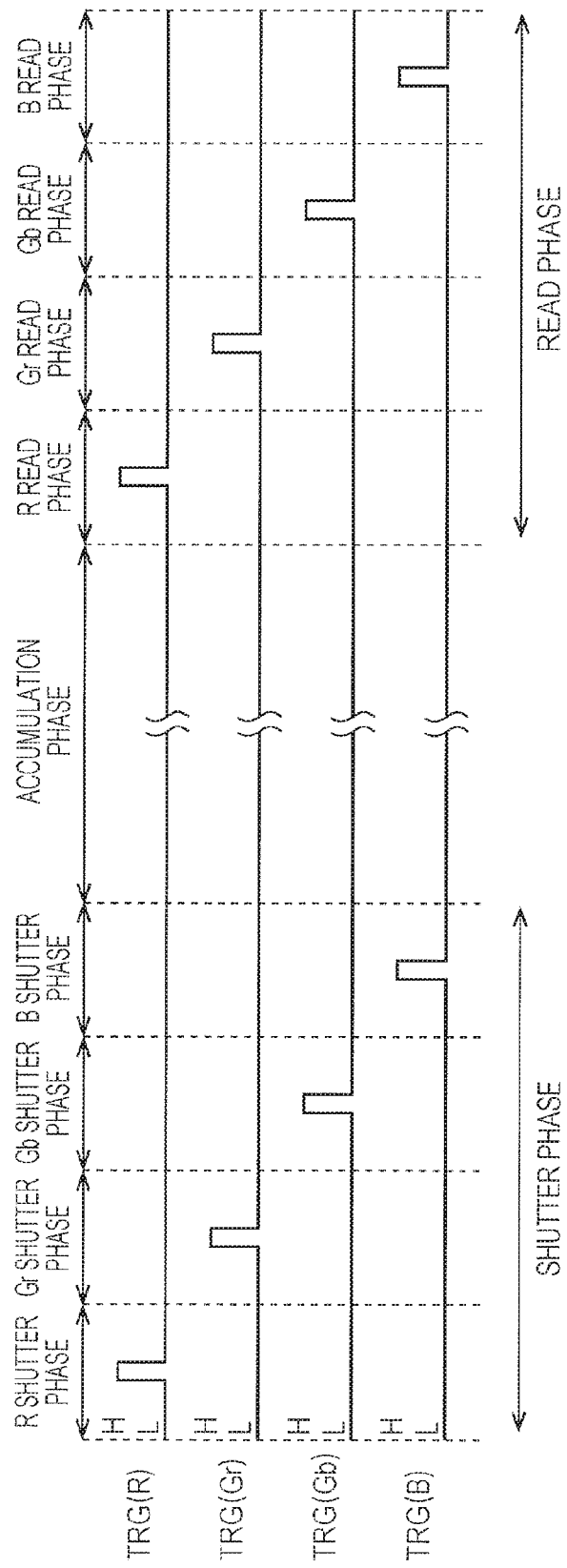
FIG. 7 is a timing chart illustrating a control signal TRG applied to a transfer transistor 62 when illuminance data of each color is obtained in an illuminometer mode.

FIG. 7 is a timing chart illustrating the control signal TRG applied to the transfer transistor 62 when illuminance data of each color is obtained in the illuminometer mode.

Here, in the present embodiment, as the Bayer array color filter is employed, there are the R, Gr, Gb, and B pixels 60 (the pixels 60 receiving light of R, Gr, Gb, and B).

FIG. 7 illustrates the control signal TRG applied to the transfer transistor 62 when illuminance data of each color of R, Gr, Gb, and B is obtained.

Here, hereinafter, the control signal TRG applied to the transfer transistor 62 of the R pixel 60 is also referred to as "control signal TRG(R)". Similarly, the control signals TRG applied to the transfer transistors 62 of the Gr, Gb, and B pixels 60 are also referred to as "control signals TRG(Gr), TRG(Gb), and TRG(B)".

In the illuminometer mode, when illuminance data of each color is obtained, the shutter phase is divided into, for example, an R shutter phase, a Gr shutter phase, a Gb shutter phase, and a B shutter phase chronologically. Similarly, the read phase is also divided into, for example, an R read phase, a Gr read phase, a Gb read phase, and a B read phase chronologically.

In the R shutter phase and the R read phase, among the control signals TRG(R), TRG(Gr), TRG(Gb), and TRG(B), only the control signal TRG(R) temporarily transitions from the L level to the H level.

Similarly, the control signal TRG(Gr), the control signal TRG(Gb), and the control signal TRG(B) temporarily transition from the L level to the H level in the Gr shutter phase and the Gr read phase, the Gb shutter phase and the Gb read phase, the B shutter phase and the B read phase, respectively.

Thus, in the ADC 33, similarly to the example described above with reference to FIG. 6, illuminance data of colors of R, Gr, Gb, and B can be temporally divided.

Further, illuminance data independent of a color or illuminance data of each color can be obtained such that a voltage corresponding to charges obtained by the pixels 60 of the M.times.N pixel units 11.sub.1,1 to 11.sub.M,N is supplied to the ADC 24.sub.1 to 24.sub.N through the vertical signal line 42.sub.1 to 42.sub.N and the selector 23 (FIG. 1), and all pixel data obtained by the CDS and the AD conversion performed by the ADC 24.sub.1 to 24.sub.N is added or the pixel data is added for each color.

However, in this case, in order to obtain the illuminance data, it is necessary to operate all the N ADCs 24.sub.1 to 24.sub.N, and power consumption increases.

Meanwhile, when a voltage corresponding to charges obtained by the pixel 60 is supplied to the ADC 33 through the power line 51, and the illuminance data is obtained by the CDS and the AD conversion performed by the ADC 33, the illuminance data is obtained by operating only one ADC 33, and thus the power consumption can be significantly reduced compared to when all the N ADCs 24.sub.1 to 24.sub.N are operated.

[Countermeasure Against Noise Generated by Coupling of Control Line TRG and Power Line 51]

Figure 8:
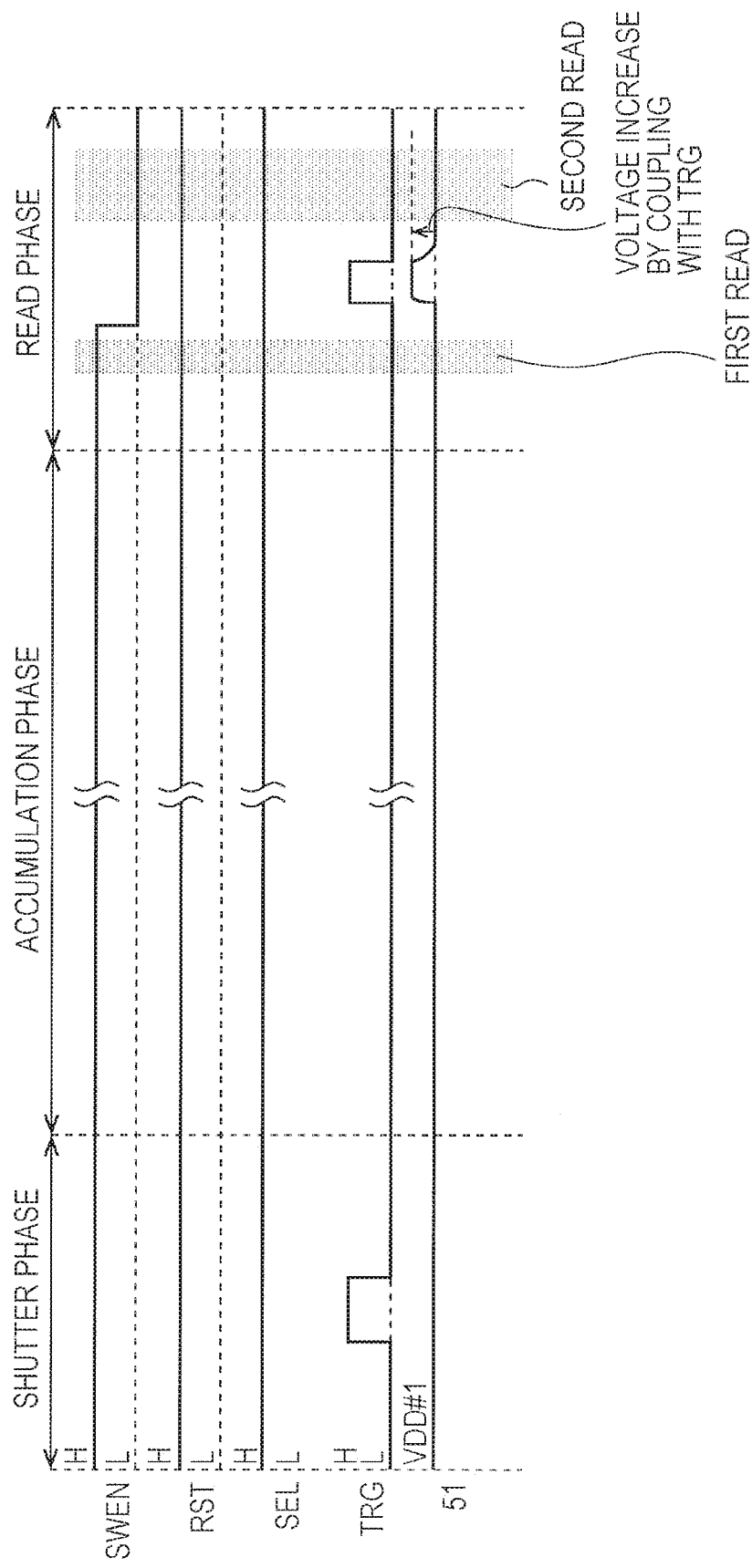
FIG. 8 is a diagram for describing a noise generated due to coupling between a control line TRG and a power line 51.

FIG. 8 is a diagram for describing a noise generated by coupling of the control line TRG and the power line 51.

In other words, FIG. 8 illustrates the read enable signal SWEN, the control signals RST, SEL, and TRG, and the voltage of the power line 51 in the illuminometer mode. In FIG. 8, for simplification of description, charges (signal charges) accumulated in the PD 61 are assumed to be 0 (a dark state in which light is not incident to the PD 61).

Here, in the present embodiment, when the read enable signal SWEN has the H level (when the power line 51 is not in the floating state), the voltage VDD#2 obtained by stepping the voltage VDD#1 down by the voltage step-down unit 73 (FIG. 5) is applied to the power line 51, but in FIG. 8, the voltage VDD#1 other than the voltage VDD#2 is assumed to be applied to the power line 51.

In the illuminometer mode, as described above with reference to FIG. 6, in the read phase, after the power line 51 enters the floating state (after the read enable signal SWEN transitions from the H level to the L level), the control signal TRG applied to the transfer transistor 62 temporarily transitions from the L level to the H level.

In the image sensor, in the case in which the control line TRG of the pixel control line 41.sub.m through which the control signal TRG flows is arranged to be adjacent to the power line 51, when the control signal TRG flowing through the control line TRG temporarily transitions to the H level, due to coupling of the control line TRG and the power line 51 in the floating state, a noise may be generated in the power line 51, that is, the voltage of the power line 51 may temporarily increase as the control signal TRG temporarily transitions to the H level as illustrated in FIG. 8.

In the case in which the switch unit 70 that causes the power line 51 to enter the floating state is configured to include the pMOS FET 72 as illustrated in FIG. 5, when the voltage of the power line 51 connected to the drain of the FET 72, a potential difference between the gate of the FET 72 and (the drain of the FET 72 connected to) the power line 51 increases (when a portion of the FET 72 connected to the power line 51 is regarded as a source), and the FET 72 enters the on state, and thus electric current flows from the power line 51 to (the source of) the FET 72.

In this case, charges flowing into the power line 51 come out from the power line 51 through the FET 72 in the on state, and the accuracy of the illuminance data obtained by the ADC 33 deteriorates.

In the state in which the read enable signal SWEN has the H level and the voltage VDD#1 other than the voltage VDD#2 is being applied to the power line 51 as illustrated in FIG. 8, when the power line 51 in the floating state increases due to the coupling of the control line TRG and the power line 51 as described above, the voltage of the power line 51 exceeds the voltage VDD#1 of the substrate of the FET 72, and thus the accuracy of the illuminance data obtained by the ADC 33 deteriorates.

In this regard, in the present embodiment, as a countermeasure against a noise generated by the coupling of the control line TRG and the power line 51, the voltage VDD#2 obtained by stepping the voltage VDD#1 down through the voltage step-down unit 73 (FIG. 5) is applied to the power line 51.

Figure 9:
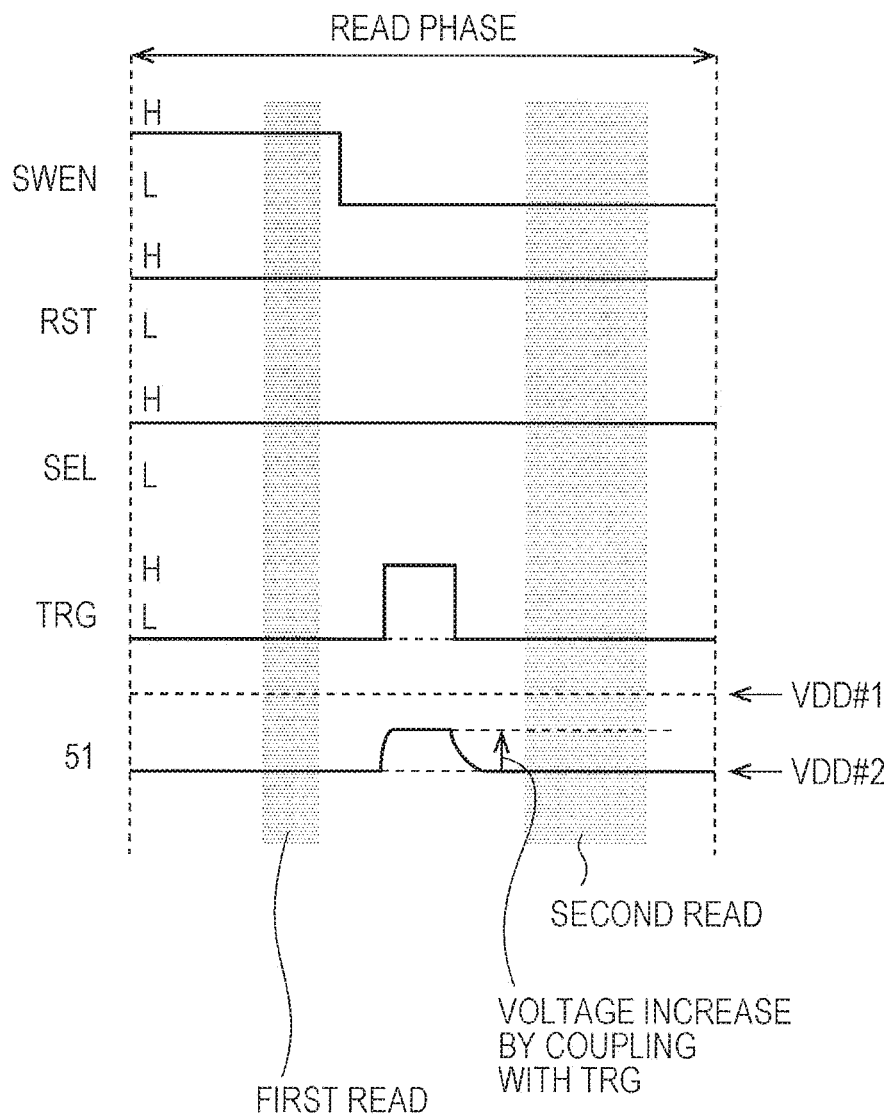
FIG. 9 is a diagram illustrating a change in a voltage of a power line 51 when a voltage VDD#2 obtained by stepping a voltage VDD#1 down is applied to the power line 51.

FIG. 9 is a diagram illustrating a change in the voltage of the power line 51 when the voltage VDD#2 obtained by stepping the voltage VDD#1 down is applied to the power line 51. In FIG. 9, similarly to FIG. 8, for convenience of description, the charges accumulated in the PD 61 are assumed to be 0.

In the case in which the voltage VDD#2 obtained by stepping the voltage VDD#1 down in the voltage step-down unit 73 (FIG. 5) is applied to the power line 51, in the read phase, although when the power line 51 enters the floating state, the control signal TRG flowing through the control line TRG temporarily transitions to the H level, and the voltage of the power line 51 temporarily increases due to the coupling of the control line TRG and the power line 51, it is possible to prevent the voltage of the power line 51 from exceeding the voltage VDD#1 of the gate of the FET 72 as illustrated in FIG. 9.

Here, the voltage VDD#2 is preferably lower than the voltage VDD#1 by a voltage equal to or higher than an increase in the voltage of the power line 51 by the coupling of the control line TRG and the power line 51.

Here, as described above with reference to FIG. 6, in the read phase, the voltage of the power line 51 in the floating state drops from the voltage VDD#2 by a voltage (illuminance signal) corresponding to the charges accumulated in the PD 61.

Thus, when the voltage VDD#2 is too low, in the illuminometer mode, the voltage of the power line 51 hardly drops from the voltage VDD#2 by the voltage corresponding to the charges accumulated in the PD 61, and a total amount (a saturated amount of charges) of charges that can be accumulated in the PDs 61 of all the pixels substantially used to measure the illuminance, eventually, a dynamic range of illuminance data is limited.

In this regard, the voltage VDD#2 is preferably decided in view of both an increase in the voltage of the power line 51 by the coupling of the control line TRG and the power line 51 and the saturated amount of charges.

Further, a circuit having a variable step-down width (drop width) in which the voltage VDD#1 is stepped down may be employed as the voltage step-down unit 73 of FIG. 5.

In this case, the step-down width of the voltage step-down unit 73 may be adjusted, for example, according to external control.

Further, the voltage step-down unit 73 may measure an increase in the voltage of the power line 51 by the coupling with the control line TRG and adjust the step-down width to the increase or a value obtained by adding a certain margin to the increase.

As the step-down width of the voltage step-down unit 73 is adjusted, it is possible to prevent a deterioration in the accuracy of the illuminance data and adjust the voltage of the power line 51 serving as an input of the ADC 33 to an appropriate voltage range.

[Description of Clamp Unit 32]

Figure 10:
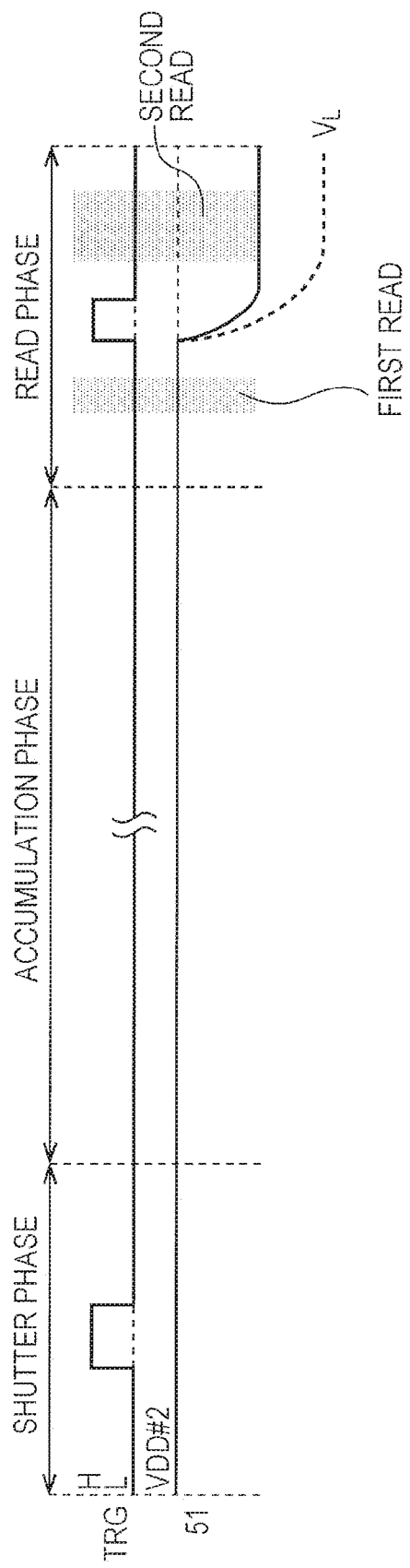
FIG. 10 is a diagram for describing a clamp unit 32.

FIG. 10 is a diagram for describing the clamp unit 32 illustrated in FIG. 1.

In other words, FIG. 10 is a timing chart illustrating the control signal TRG and the voltage of the power line 51 in the illuminometer mode.

In the illuminometer mode, as described above with reference to FIGS. 6 and 7, as the transfer transistors 62 of all the pixels 60 of the M.times.N pixel units $11_{1,1}$ to $11_{M,N}$ simultaneously enter the on state or only the transfer transistors 62 of the R pixels 60, the Gr pixels 60, the Gb pixels 60, or the B pixels 60 simultaneously enter the on state, illuminance data independent of a color or illuminance data of R, Gr, Gb, or B can be obtained.

Meanwhile, in the illuminometer mode, in the read phase, as the transfer transistor 62 is turned on, the charges (electrons) accumulated in the PD 61 collectively flow to the power line 51 in the floating state from all the pixels 60 of the M.times.N pixel units $11_{1,1}$ to $11_{M,N}$ or the R pixels 60, the Gr pixels 60, the Gb pixels 60, or the B pixel 60 among the pixels 60.

As described above, when charges flow to the power line 51 in the floating state from many pixels 60 such as all the pixels 60 or the R pixels 60, the Gr pixels 60, the Gb pixels 60, or the B pixel 60, there are cases in which the voltage of the power line 51 significantly drops from the voltage VDD#2 as indicated by a dotted line in FIG. 10.

In the illuminometer mode, as described above, since the reset transistor 63 is constantly in the on state, when the voltage of the power line 51 significantly drops, voltage (potential) of the FD of the pixel unit $11_{m,n}$ (FIG. 2), that is, the voltage of the drain of the transfer transistor 62 or the gate of the amplifying transistor 64 significantly drops through the reset transistor 63 connected to the power line 51 as well, and thus the voltage of the gate of the amplifying transistor 64 is likely to exceed a performance guarantee voltage range in which the performance is guaranteed.

Further, when the voltage the gate of the amplifying transistor 64 exceeds the performance guarantee voltage range in which the performance is guaranteed, reliability of the pixel unit $11_{m,n}$, eventually, reliability of the image sensor is undermined.

In this regard, the clamp unit 32 (FIG. 1) clamps the voltage of the power line to the voltage VDD#4 that is lower than the voltage VDD#2 and equal to or higher than a minimum value of the performance guarantee voltage.

Figure 11:
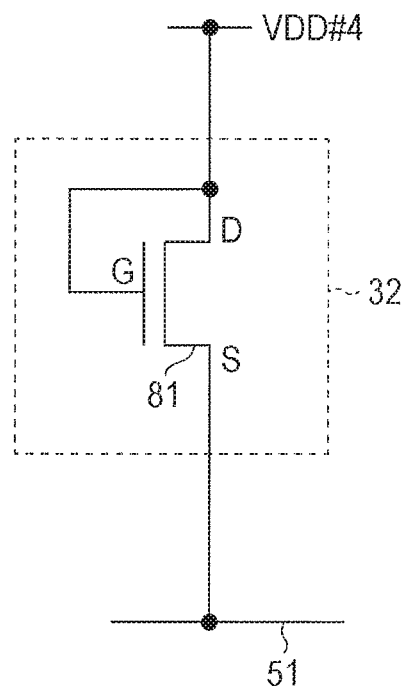
FIG. 11 is a circuit diagram illustrating an exemplary configuration of a clamp unit 32.

FIG. 11 is a circuit diagram illustrating an exemplary configuration of the clamp unit 32 of FIG. 1.

Referring to FIG. 11, the clamp unit 32 includes an nMOS FET 81.

In the clamp unit 32, a source of the FET 81 connected to the power line 51, and a gate and a drain thereof are connected to the power source VDD#4.

In the clamp unit 32 of FIG. 11, since the gate of the FET 81 is connected to the power source VDD#4, when the voltage of the power line 51 connected to the source of the FET 81 falls to be lower than the voltage VDD#4 (accurately, to be equal to or lower than a value obtained by subtracting a voltage $V_{GS}$ between the gate and the source of the FET 81 from the voltage VDD#4), the FET 81 enters the on state. As a result, the power line 51 is clamped to the voltage VDD#4 connected to the power source VDD#4 through the FET 81.

Since the power line 51 is clamped to the voltage VDD#4 that is lower than the voltage VDD#2 and equal to or higher than a minimum value of the performance guarantee voltage as described above, it is possible to prevent a phenomenon that the voltage of the power line 51 drops from the voltage VDD#2 by a certain voltage or more and exceeds the performance guarantee voltage range, and eventually, the voltage of the FD (the gate of the amplifying transistor 64) of the pixel unit $11_{m,n}$ exceeds the performance guarantee voltage range.

Further, when the power line 51 is clamped by the clamp unit 32, a notification representing that there is an illuminance measurement error in the image sensor can be given to the outside.

[Exemplary Configuration of Pixel Drive Unit 21]

Figure 12:
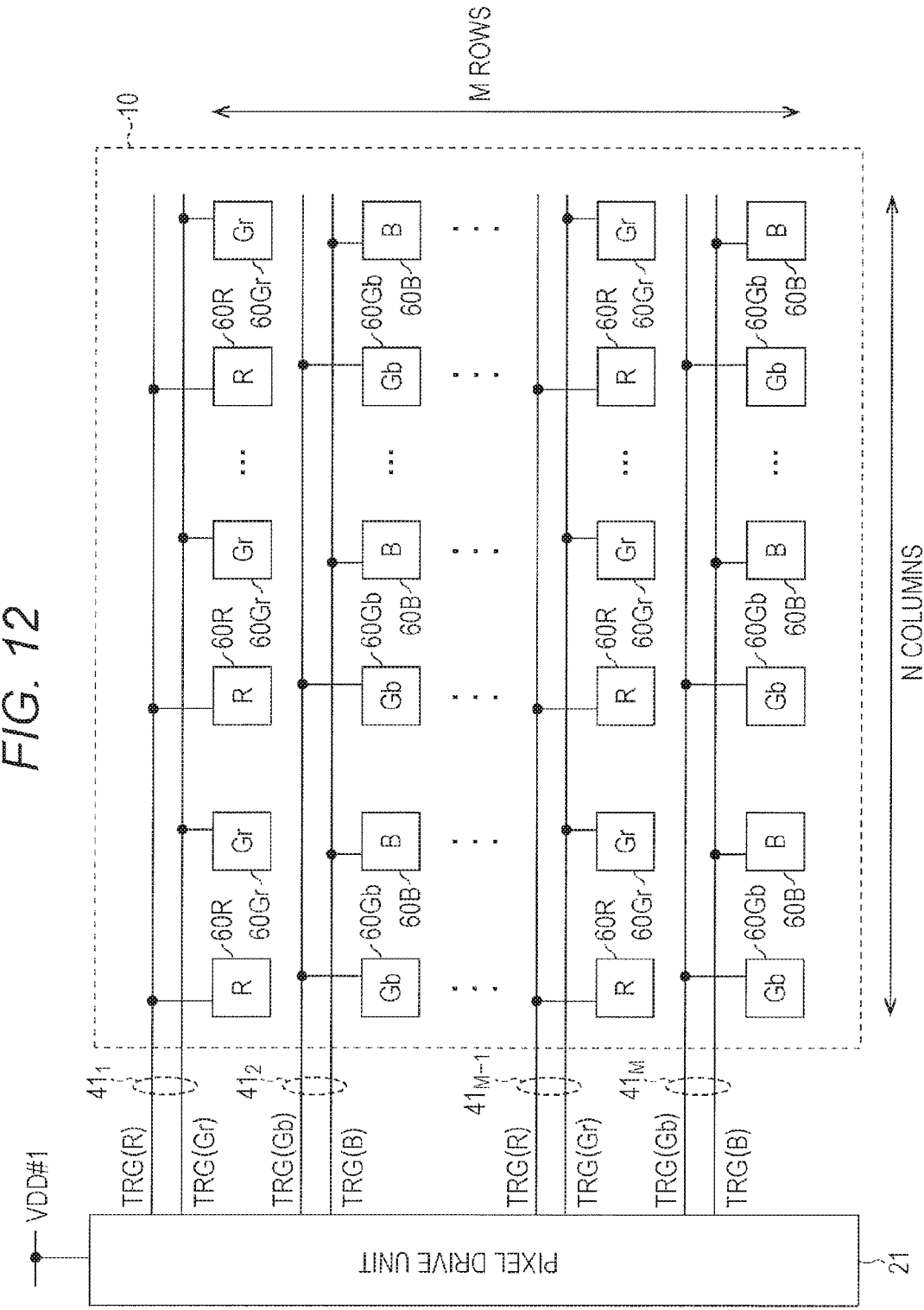
FIG. 12 is a diagram for describing a pixel control line 41.sub.m connected to a pixel drive unit 21.

FIG. 12 is a diagram for describing the pixel control line $41_m$ connected to the pixel drive unit 21 illustrated in FIG. 1.

In FIG. 12, the pixel unit $11_{m,n}$ is assumed to include one pixel 60, and hereinafter, appropriately, an R pixel 60 is referred to as a pixel 60R, a Gr pixel 60 is referred to as a pixel 60Gr, a Gb pixel 60 is referred to as a pixel 60Gb, and a B pixel 60 is referred to as a pixel 60B.

Further, the control lines TRG through which the control signals TRG(R), TRG(Gr), TRG(Gb), and TRG(B) given by the pixel drive unit 21 flow are also referred to as control lines TRG(R), TRG(Gr), TRG(Gb), and TRG(B), respectively.

In the Bayer array illustrated in FIG. 12, among the R pixel 60R, the Gr pixel 60Gr, the Gb pixel 60Gb, and the B pixel 60B, only the R pixel 60R and the Gr pixel 60Gr are present in (2k−1)-th rows that are odd-numbered rows (k=1, 2, . . . , and M/2). Further, only the Gb pixel 60Gb and the B pixel 60B are present in 2k-th rows that are even-numbered rows.

Thus, the pixel control line $41_{2k-1}$ of the (2k−1)-th row that is the odd-numbered row includes the two control lines TRG(R) and TRG(Gr) as the control line TRG, and the pixel control line $41_{2k}$ of the 2k-th row that is the even-numbered rows include the two control lines TRG(Gb) and TRG(B) as the control line TRG.

Since the pixel control line $41_{2k-1}$ of the odd-numbered row include the two control lines TRG(R) and TRG(Gr), and the pixel control line $41_{2k}$ of the even-numbered row includes the two control lines TRG(Gb) and TRG(B) as described above, the 2M control lines TRG are included in the M pixel control lines $41_1$ to $41_M$ as the control lines TRG(R), TRG(Gr), TRG(Gb), and TRG(B).

When illuminance data of each color of R, Gr, Gb, and B is obtained, the control signal TRG(R), the control signal TRG(Gr), the control signal TRG(Gb), and the control signal TRG(B) temporarily transition from the L level to the H level in the R shutter phase and the R read phase, the Gr shutter phase and the Gr read phase, the Gb shutter phase and the Gb read phase, and the B shutter phase and the B read phase, respectively, as described above with reference to FIG. 7.

In other words, in the R shutter phase and the R read phase, only (the control signal TRG(R) flowing through) the control line TRG(R) included in the pixel control line $41_{2k-1}$ of the odd-numbered row temporarily transitions to the H level, and in the Gr shutter phase and the Gr read phase, only the control line TRG(Gr) included in the pixel control line 41.sub.2k−1 of the odd-numbered row temporarily transitions to the H level.

Further, in the Gb shutter phase and the Gb read phase, only the control line TRG(Gb) included in the pixel control line 41.sub.2k of the even-numbered rows temporarily transitions to the H level, and in the B shutter phase and the B read phase, only the control line TRG(B) included in the pixel control line 41.sub.2k of the even-numbered row temporarily transitions to the H level.

Figure 13:
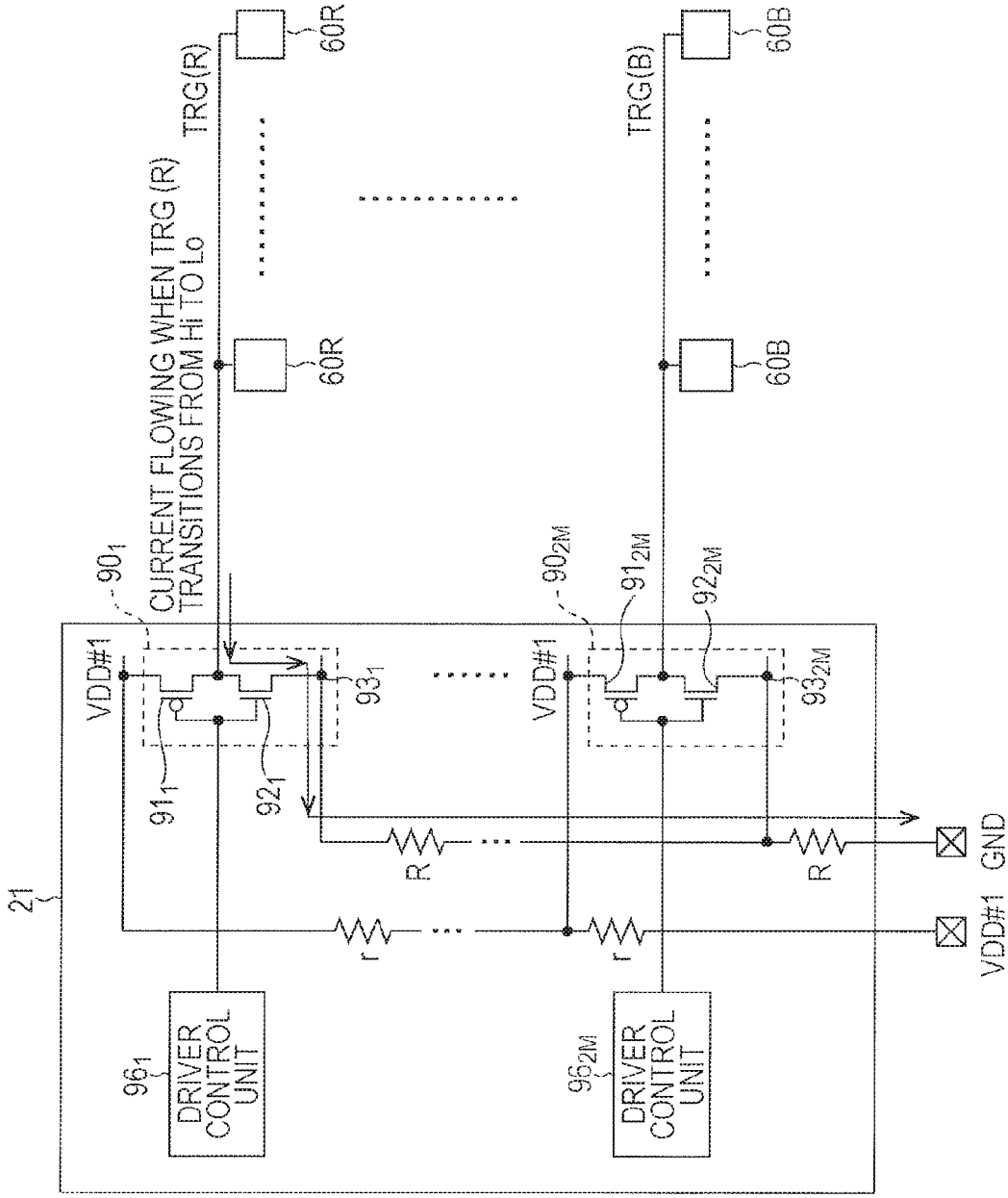
FIG. 13 is a block diagram illustrating a first exemplary configuration of a pixel drive unit 21.

FIG. 13 is a block diagram illustrating a first exemplary configuration of the pixel drive unit 21 illustrated in FIG. 1.

In other words, FIG. 13 illustrates a first exemplary configuration of a portion of the pixel drive unit 21 for controlling the transfer transistor 62.

Referring to FIG. 13, the pixel drive unit 21 includes 2M TRG drivers 90.sub.1 to 90.sub.2M and 2M driver control units 96.sub.1 to 96.sub.2M.

The TRG driver 90.sub.4k−3 applies the control signal TRG(R) to the control line TRG(R) included in the pixel control line 41.sub.2k−1, and controls the transfer transistors 62 of the pixels 60R among the pixels 60R and 60Gr of the (2k−1)-th row.

The TRG driver 90.sub.4k−2 applies the control signal TRG(Gr) to the control line TRG(Gr) included in the pixel control line 41.sub.2k−1, and controls the transfer transistors 62 of the pixels 60Gr among the pixels 60R and 60Gr of the (2k−1)-th row.

The TRG driver 90.sub.4k−1 applies the control signal TRG(Gb) to the control line TRG(Gb) included in the pixel control line 41.sub.2k, and controls the transfer transistors 62 of the pixels 60Gb among the pixels 60Gb and 60B of the 2k-th row.

The TRG driver 90.sub.4k applies the control signal TRG(B) to the control line TRG(B) included in the pixel control line 41.sub.2k, and controls the transfer transistors 62 of the pixels 60B among the pixels 60Gb and 60B of the 2k-th row.

The TRG driver 90.sub.q (q=1, 2, . . . , and 2M) includes a pMOS FET 91.sub.q and an nMOS FET 92.sub.q in which drains are connected with each other, and gates are connected with each other.

Further, a connection point of the drains of the FET 91.sub.q and 92.sub.q is connected to the control line TRG, and a connection point of the gates of the FETs 91.sub.q and 92.sub.q is connected to the driver control unit 96.sub.q.

Further, the connection point of the drains of the FETs 91.sub.q and 92.sub.q serves as an output terminal of the TRG driver 90.sub.q, and the connection point of the gates of the FETs 91.sub.q and 92.sub.q serves as an input terminal of the TRG driver 90.sub.q.

The source of the pMOS FET 91.sub.q is connected to the power source VDD#1 through a series circuit in which a plurality of resistors r are connected in series, and the source of the nMOS FET 92.sub.q is connected to the GND (ground) through a series circuit in which a plurality of resistors (power source interconnection resistors) R are connected in series.

Here, in the TRG driver 90.sub.q, a connection point of the source of the nMOS FET 92.sub.q and the series circuit in which the plurality of resistors R are connected in series is also referred to as a node 93.sub.q.

A TRG driver 96.sub.q controls the TRG driver 90.sub.q, for example, according to an external command, a predetermined sequence, or the like.

In other words, the TRG driver 96.sub.q applies, for example, the H level or the L level to the gates of the FETs 91.sub.q and 92.sub.q of the TRG driver 90.sub.q.

When the H level is applied to the gates of the FETs 91.sub.q and 92.sub.q, the pMOS FET 91.sub.q enters the off state, and the nMOS FET 92.sub.q enters the on state, and thus the connection point of the drains of the FET 91.sub.q and 92.sub.q serving as the output terminal of the TRG driver 90.sub.q is connected to the node 93.sub.q through the FET 92.sub.q in the on state.

The node 93.sub.q is connected to the GND through the series circuit in which the plurality of resistors R are connected in series, and a voltage (potential) of the node 93.sub.q is equal to GND potential unless electric current flows through the series circuit in which the plurality of resistors R are connected in series.

Thus, the output terminal (the connection point of the drains of the FETs 91.sub.q and 92.sub.q) of the TRG driver 90.sub.q connected to the node 93.sub.q through the FET 92.sub.q in the on state has the L level (GND potential), and the control line TRG connected to the output terminal of the TRG driver 90.sub.q also has the L level.

Meanwhile, when the L level is applied to the gates of the FETs 91.sub.q and 92.sub.q, the pMOS FET 91.sub.q enters the on state, and the nMOS FET 92.sub.q enters the off state, and thus the connection point of the drains of the FET 91.sub.q and 92.sub.q serving as the output terminal of the TRG driver 90.sub.q is connected to the power source VDD#1 through the FET 91.sub.q in the on state.

Thus, the output terminal (the connection point of the drains of the FETs 91.sub.q and 92.sub.q) of the TRG driver 90.sub.q transitions to the H level (the voltage VDD#1), and the control line TRG connected to the output terminal of the TRG driver 90.sub.q transitions to the H level as well.

In the pixel drive unit 21 having the above configuration, for example, as illustrated in FIG. 7, in the case in which illuminance data of each color of R, Gr, Gb, and B is obtained, when charges are transferred, for example, from the PDs 61 of the R pixels 60R among the R, Gr, Gb, and B pixels, the TRG driver 90.sub.4k−3 collectively causes all the control lines TRG(R) connected to the transfer transistors 62 of the R pixels 60R to temporarily transition to the H level.

Then, the control lines TRG(R) connected to the transfer transistors 62 transition to the H level and then transition to the L level, but when the control line TRG(R) transitions to the L level again, the nMOS FET 92.sub.4k−3 of the TRG driver 90.sub.4k−3 enters the on state.

In this case, the charges of the gates of the transfer transistors 62 of the R pixels 60R connected to the control line TRG(R) flow to the node 93.sub.4k−3 and the series circuit, in which the plurality of resistors R are connected in series, connected to the node 93.sub.4k−3 through the control line TRG(R) and the FET 92.sub.4k−3 in the on state.

The above-described phenomenon occurs on all the R pixels 60R at the same time when the control line TRG(R) transitions to the L level immediately after it temporarily transitions to the H level, and thus corresponding voltage drop (so-called IR drop) occurs in the series circuit in which the plurality of resistors R are connected in series due to the charges (electric current) flowing the resistors R of the series circuit.

Due to the IR drop caused by the series circuit in which the plurality of resistors R are connected in series, a voltage (potential) of the node 93.sub.4k−3 of the TRG driver 90.sub.4k−3 connected to the control line TRG(R) that has temporarily transitioned to the H level, a voltage (potential) of the node 93.sub.4k−2 of the TRG driver 90.sub.4k−2 connected to the control line TGR(Gr) that has not transitioned to the H level (that has maintained the L level), a voltage (potential) of the node 93.sub.4k−1 of the TRG driver 90.sub.4k−1 connected to the control line TGR(Gb), and a voltage (potential) of the node 93.sub.4k of the TRG driver 90.sub.4k connected to the control line TGR(B) change from the GND potential.

In other words, when the control lines TRG(R) temporarily transition to the H level and then transition to the L level at the same time, the IR drop is caused by the series circuit in which the plurality of resistors R are connected in series. As a result, the voltage of the node 93.sub.4k−3 of the TRG driver 90.sub.4k−3 connected to the control line TRG (R), the voltage of the node 93.sub.4k−2 of the TRG driver 90.sub.4k−2 connected to the control line TGR(Gr) that has not transitioned to the H level (that has maintained the L level), the voltage (of the node 93.sub.4k−1 of the TRG driver 90.sub.4k−1 connected to the control line TGR(Gb), and the voltage of the node 93.sub.4k of the TRG driver 90.sub.4k connected to the control line TGR(B) simply increase by the IR drop caused by the series circuit in which the plurality of resistors R are connected in series.

When the voltage of the node 93.sub.q increases the GND voltage, the voltage of the drain of the FET 92.sub.q whose source is connected to the node 93.sub.q and the voltage of the control line TRG connected to the drain increase as well.

In other words, in this case, although only the control line TRG(R) has temporarily transitioned to the H level, the voltages of the other control lines TRG(Gr), TRG(Gb), and TRG(B) increase by the IR drop caused by the series circuit in which the plurality of resistors R are connected in series.

For example, when the voltage of the control line TRG (Gr) increases, the transfer transistor 62 of the Gr pixel 60Gr connected to the control line TRG(Gr) enters the on state, the charges accumulated in the PD 61 leak through the transfer transistor 62 in the on state, and the accuracy of the illuminance data of a Gr color obtained by the ADC 33 deteriorates.

Similarly, the accuracy of the illuminance data of each color of Gb, and B deteriorates.

When only the control line TRG connected to the pixels 60 of a certain color among R, Gr, Gb, and B temporarily transitions to the H level as described above, the IR drop caused by the series circuit in which the plurality of resistors R are connected in series is propagated to the pixels 60 of the other colors as a noise, and thus the accuracy of the illuminance data of each color deteriorates.

Figure 14:
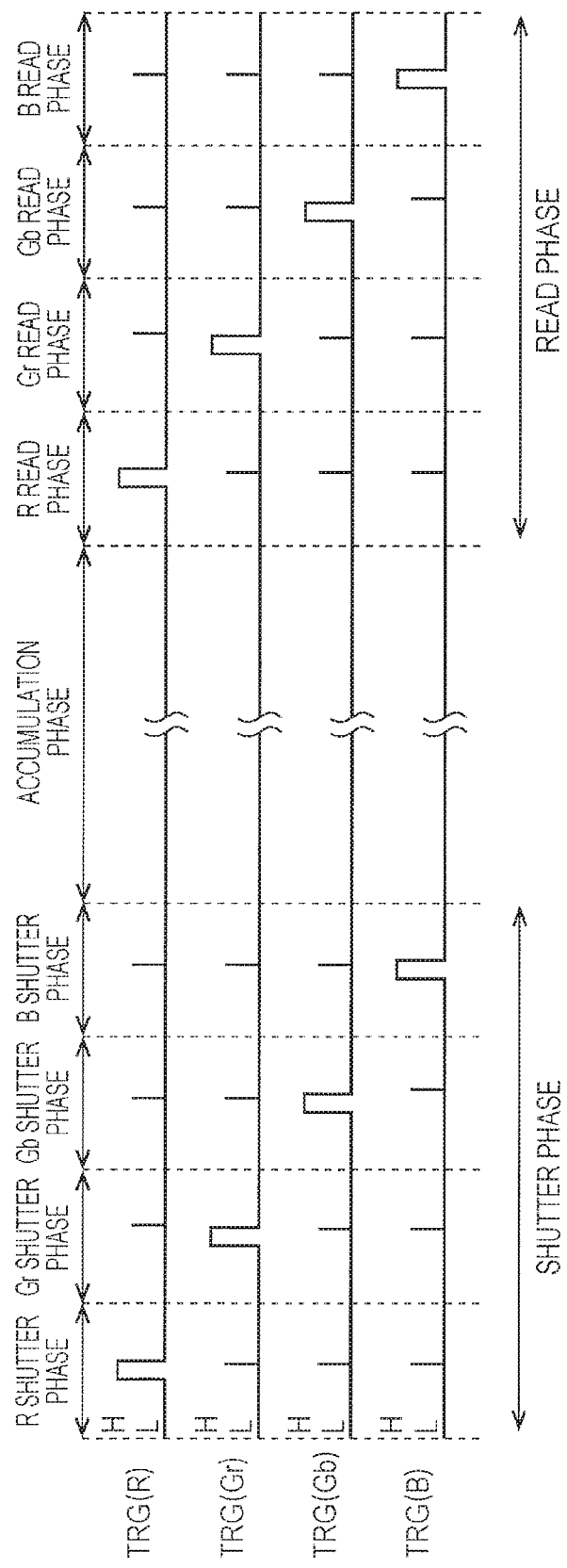
FIG. 14 is a timing chart illustrating a voltage (control signal TRG) when illuminance data of each color is obtained in an illuminometer mode.

FIG. 14 is a timing chart illustrating the voltage (the control signal TRG) of the control line TRG when the illuminance data of each color is obtained in the illuminometer mode.

For example, when (the voltage of) the control line TRG(R) has temporarily transitioned to the H level, if the control line TRG(R) transitions from the H level to the L level, the IR drop described above with reference to FIG. 13 occurs, and the voltage of the other control lines TRG(Gr), TRG(Gb), and TRG(B) increase.

Further, for example, when the control line TRG(Gr) has temporarily transitioned to the H level, if the control line TRG(Gr) transitions from the H level to the L level, the IR drop described above with reference to FIG. 13 occurs, and the voltages of the other control lines TRG(R), TRG(Gb), and TRG(B) increase.

As described above, when any one of the control line TRG(R), TRG(Gr), TRG(Gb), and TRG(B), that is, the control line TRG of any one color has temporarily transitioned to the H level, if the corresponding control line TRG transitions from the H level to the L level, the IR drop described above with reference to FIG. 13 occurs.

Further, due to the IR drop, the voltages of the control lines TRG of the other colors increase, the charges accumulated in the PD 61 leak, and thus the accuracy of the illuminance data of each color of R, Gr, Gb, and B obtained by the ADC 33 deteriorates.

Figure 15:
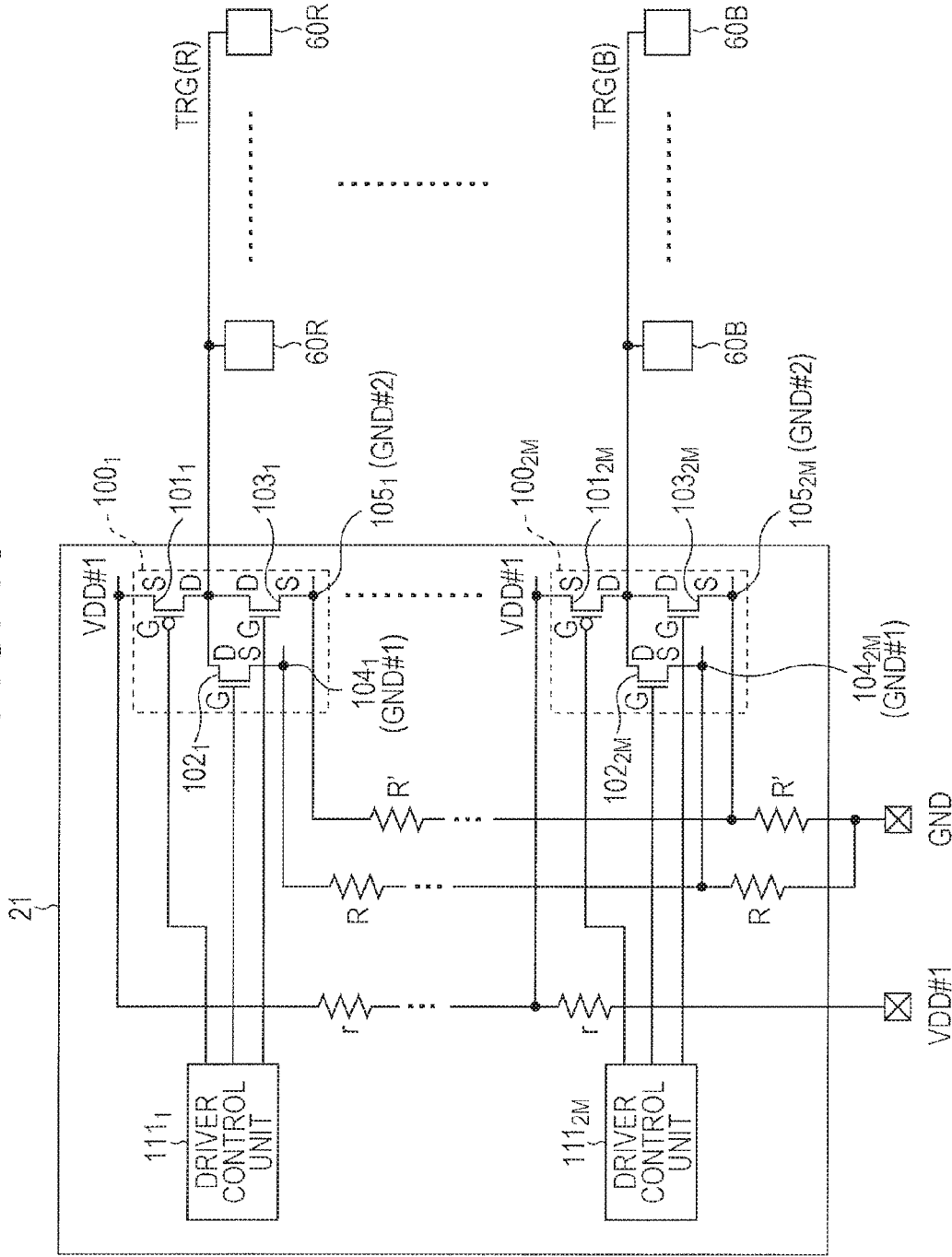
FIG. 15 is a block diagram illustrating a second exemplary configuration of a pixel drive unit 21.

In this regard, FIG. 15 is a block diagram illustrating a second exemplary configuration of the pixel drive unit 21 of FIG. 1.

In other words, FIG. 15 illustrates a second exemplary configuration of a portion of the pixel drive unit 21 for controlling the transfer transistor 62.

Referring to FIG. 15, the pixel drive unit 21 includes 2M TRG drivers 100.sub.1 to 100.sub.2M and 2M driver control units 111.sub.1 to 111.sub.2M.

The TRG driver 100.sub.4k−3 applies the control signal TRG(R) to the control line TRG(R) included in the pixel control line 41.sub.2k−1, and controls the transfer transistors 62 of the pixels 60R among the pixels 60R and 60Gr of the (2k−1)-th row.

The TRG driver 100.sub.4k−2 applies the control signal TRG(Gr) to the control line TRG(Gr) included in the pixel control line 41.sub.2k, and controls the transfer transistors 62 of the pixels 60Gr among the pixels 60R and 60Gr of the (2k−1)-th row.

The TRG driver 100.sub.4k−1 applies the control signal TRG(Gb) to the control line TRG(Gb) included in the pixel control line 41.sub.2k, and controls the transfer transistors 62 of the pixels 60Gb among the pixels 60Gb and 60B of the 2k-th row.

The TRG driver 100.sub.4k applies the control signal TRG(B) to the control line TRG(B) included in the pixel control line 41.sub.2k, and controls the transfer transistors 62 of the pixels 60B among the pixels 60Gb and 60B of the 2k-th row.

The TRG driver 100.sub.q (q=1, 2, . . . , 2M) includes a pMOS FET 101.sub.q, and nMOS FETs 102.sub.q and 103.sub.q.

Drains of the FETs 101.sub.q, 102.sub.q, and 103.sub.q are connected with one another, and a connection point of the drains is connected to the control line TRG. The connection point of the drains of the FETs 101.sub.q, 102.sub.q, and 103.sub.q serves as an output terminal of the TRG driver 100.sub.q.

A source of the pMOS FET 101.sub.q is connected to the power source VDD#1 through a series circuit in which a plurality of the resistor r are connected in series, and a source of the nMOS FET 102.sub.q is connected to the GND through a series circuit in which a plurality of resistors (power source interconnection resistors) R are connected in series. Further, the source of the nMOS FET 103.sub.q is connected to the GND (ground) through a series circuit in which a plurality of resistors (power source interconnection resistors) R' are connected in series.

Here, hereinafter, appropriately, in the TRG driver 100.sub.q, a connection point of the source of the nMOS FET 102.sub.q and the series circuit in which the plurality of resistors R are connected in series is referred to as a node 104.sub.q, and a connection point of the source of the nMOS FET 103.sub.q and the series circuit in which the plurality of resistors R' are connected in series is referred to as a node 105.sub.q.

Further, a voltage (potential) of the node 104.sub.q is referred to as GND#1, and a voltage (potential) of the node 105.sub.q is referred to as GND#2.

The node 104.sub.q is connected to the GND through the series circuit in which the plurality of resistors R are connected in series, and thus the voltage GND#1 of the node 104.sub.q is equal to the GND potential unless an electric current flows through the series circuit in which the plurality of resistors R are connected in series.

Similarly, the node 105.sub.q is connected to the GND through the series circuit in which the plurality of resistors R' are connected in series, and thus the voltage GND#2 of the node 105.sub.q is equal to the GND potential unless an electric current flows through the series circuit in which the plurality of resistors R' are connected in series.

A TRG driver 111.sub.q controls the TRG driver 100.sub.q, for example, according to an external command, a predetermined sequence, or the like.

In other words, the TRG driver 111.sub.q applies the H level or the L level to the gates of the FETs 101.sub.q, 102.sub.q, and 103.sub.q configuring the TRG driver 100.sub.q, and controls the FETs 101.sub.q, 102.sub.q, and 103.sub.q such that the FETs 101.sub.q, 102.sub.q, and 103.sub.q enter the on state or the off state.

For example, when the FET 101.sub.q enters the on state and the FETs 102.sub.q and 103.sub.q enter the off state, the output terminal (the connection point of the drains of the FETs 101.sub.q, 102.sub.q, and 103.sub.q) of the TRG driver 100.sub.q is connected to the power source VDD#1 through the FET 101.sub.q in the on state.

Thus, the output terminal of the TRG driver 100.sub.q transitions to the H level (the voltage VDD#1), and the control line TRG connected to the output terminal of the TRG driver 100.sub.q transitions to the H level as well.

Further, for example, when the FET 101.sub.q and the FET 103.sub.q enter the off state and the FET 102.sub.q enters the on state, the output terminal of the TRG driver 100.sub.q is connected to the node 104.sub.q through the FET 102.sub.q in the on state.

Thus, the output terminal of the TRG driver 100.sub.q transitions to the L level (the voltage GND#1 of the node 104.sub.q), and the control line TRG connected to the output terminal of the TRG driver 100.sub.q transitions to the L level as well.

Further, for example, when the FET 101.sub.q and the FET 102.sub.q enter the off state and the FET 103.sub.q enters the on state, the output terminal of the TRG driver 100.sub.q is connected to the node 105.sub.q through the FET 103.sub.q in the on state.

Thus, the output terminal of the TRG driver 100.sub.q transitions to the L level (the voltage GND#2 of the node 105.sub.q), and the control line TRG connected to the output terminal of the TRG driver 100.sub.q transitions to the L level as well.

Figure 16:
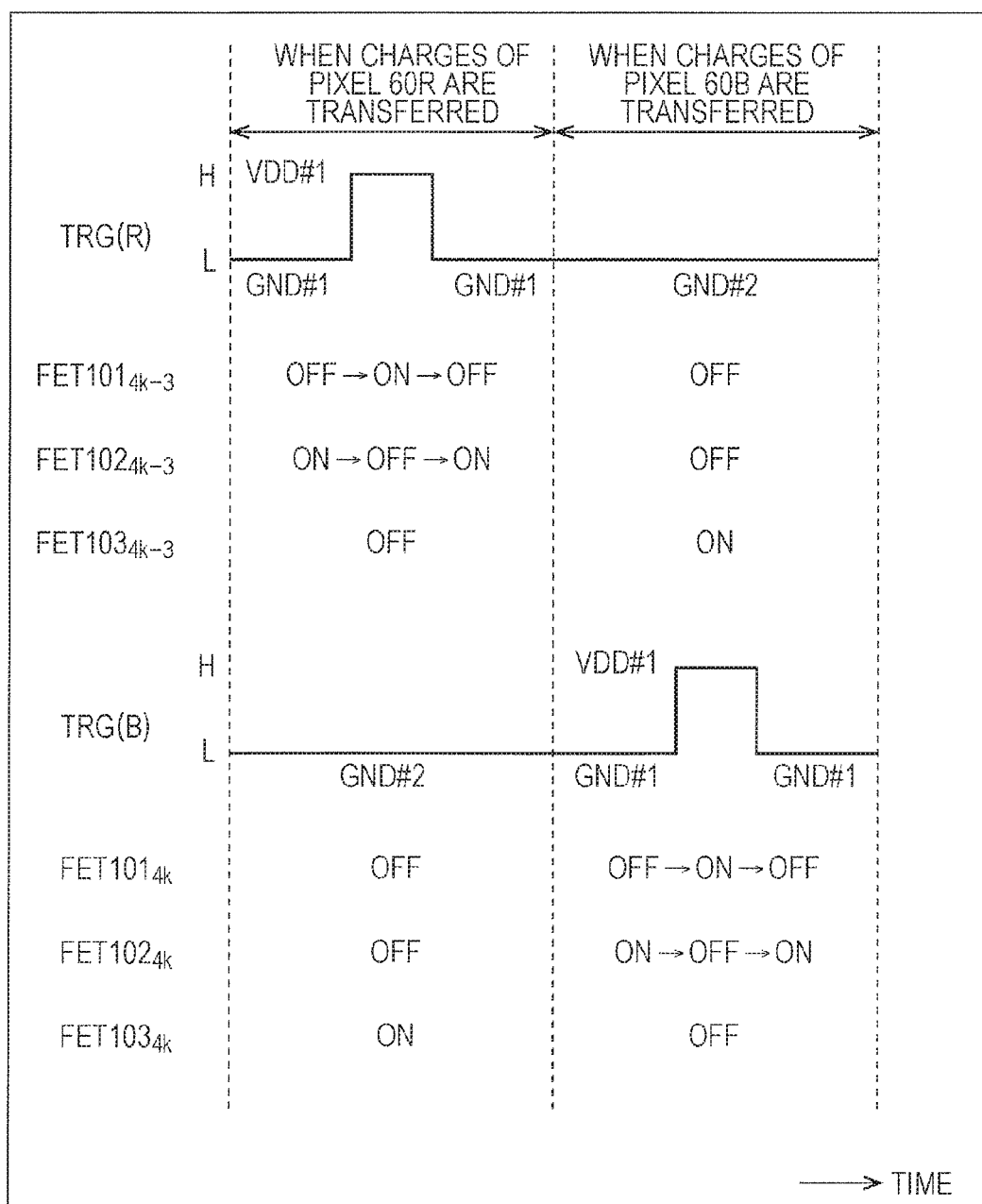
FIG. 16 is a diagram for describing an operation of a pixel drive unit 21.

FIG. 16 is a diagram for describing an operation of the pixel drive unit 21 illustrated in FIG. 15.

In other words, FIG. 16 illustrates voltages of the control lines (control signals) TRG and states of the FETs 101.sub.q to 103.sub.q configuring the TRG driver 100.sub.q when charges are transferred from the PDs 61 of the pixels of one of R, Gr, Gb, and B, for example, the PDs 61 of the R pixels 60R and when charges are transferred from the PDs 61 of the pixels of another one, for example, the PDs 61 of the B pixels 60B in the case in order to obtain illuminance data of each color of R, Gr, Gb, and B.

When charges are transferred from the PDs 61 of the R pixels 60R, in the TRG driver 100.sub.4k-3, the control lines TRG(R) connected to the transfer transistors 62 of the R pixel 60R temporarily transition to the H level.

In other words, in this case, as illustrated in FIG. 16, in the driver control unit 111.sub.4k-3, the FET 101.sub.4k-3 of the TRG driver 100.sub.4k-3 that controls the R pixels 60R transitions from the off state to the on state and then transitions to the off state.

Further, the FET 102.sub.4k-3 enters a state opposite to the state of the FET 101.sub.4k-3, that is, transitions from the on state to the off state and then transitions to the on state.

Further, the FET 103.sub.4k-3 enters the off state (without change).

Thus, first, when charges are transferred from the PDs 61 of the R pixels 60R, the FET 101.sub.4k-3 enters the off state, the FET 102.sub.4k-3 enters the on state, and the FET 103.sub.4k-3 enters the off state. In this case, since the output terminal of the TRG driver 100.sub.4k-3 is connected to the node 104.sub.4k-3 through the FET 102.sub.4k-3 in the on state, the voltage of the control line TRG(R) connected to the output terminal of the TRG driver 100.sub.4k-3 has the potential GND#1 of the node 104.sub.4k-3, that is, the L level.

Then, when charges are transferred from the PDs 61 of the R pixels 60R, the FET 101.sub.4k-3 enters the on state, the FET 102.sub.4k-3 enters the off state, and the FET 103.sub.4k-3 enters the off state. In this case, since the output terminal of the TRG driver 100.sub.4k-3 is connected to the power source VDD#1 through the FET 101.sub.4k-3 in the on state, the voltage of the control line TRG(R) connected to the output terminal of the TRG driver 100.sub.4k-3 transitions from the L level to the voltage VDD#1, that is, the H level.

Thereafter, when charges are transferred from the PDs 61 of the R pixels 60R, the FET 101.sub.4k-3 enters the off state, the FET 102.sub.4k-3 enters the on state, and the FET 103.sub.4k-3 enters the off state. In this case, since the output terminal of the TRG driver 100.sub.4k-3 is connected to the node 104.sub.4k-3 through the FET 102.sub.4k-3 in the on state, the voltage of the control line TRG(R) connected to the output terminal of the TRG driver 100.sub.4k-3 transitions from the HL level to the voltage GND#1 of the node 104.sub.4k-3, that is, the L level.

As described above, when the voltage of the control line TRG(R) transitions from the H level to the L level (the potential GND#1 of the node 104.sub.4k-3), only the FET 102.sub.4k-3 among the FETs 101.sub.4k-3 to 103.sub.4k-3 enters the on state, and in this case, as described above with reference to FIGS. 13 and 14, the charges of the gates of the transfer transistors 62 of the R pixels 60R connected to the control line TRG(R) flow to the node 104.sub.4k-3 and the series circuit in which the plurality of resistors R are connected in series connected to the node 104.sub.4k-3 through the control line TRG(R) and the FET 102.sub.4k-3 in the on state.

As a result, corresponding voltage drop (IR drop) occurs in the series circuit in which the plurality of resistors R are connected in series, and the voltages GND#1 of the node 104.sub.4k-2 of the TRG driver 100.sub.4k-2 controlling the Gr pixel 60Gr, the node 104.sub.4k-1 of the TRG driver 100.sub.4k-1 controlling the Gb pixel 60Gb, and the node 104.sub.4k of the TRG driver 100.sub.4k controlling the B pixel 60B as well as the voltages GND#1 of the node 104.sub.4k-3 of the TRG driver 100.sub.4k-3 controlling the R pixel 60R increase by the IR drop caused in the series circuit in which the plurality of resistors R are connected in series.

When charges are transferred from the PDs 61 of the R pixels 60R, in the TRG driver 100.sub.4k controlling the pixels of a color other than R, for example, the B pixels 60B, the FET 101.sub.4k enters the off state, the FET 102.sub.4k enters the off state, and the FET 103.sub.4k enters the on state under control of the driver control unit 111.sub.4k as illustrated in FIG. 16.

As described above, when only the FET 103.sub.4k among the FETs 101.sub.4k to 103.sub.4k enters the on state, the output terminal of the TRG driver 100.sub.4k is connected to the node 105.sub.4k through the FET 103.sub.4k in the on state. Thus, the voltage of the control line TRG(B) connected to the output terminal of the TRG driver 100.sub.4k has the potential GND#2 of the node 105.sub.4k, that is, the L level.

When charges are transferred from the PDs 61 of the R pixels 60R, the voltage GND#1 of the node 104.sub.q (the nodes 104.sub.4k-3, 104.sub.4k-2, 104.sub.4k-1, and 104.sub.4k) increases by the IR drop caused by the series circuit in which the plurality of resistors R are connected in series, but since the output terminal of the TRG driver 100.sub.4k controlling the B pixel 60B other than the R pixel 60R is connected to the node 105.sub.4k other than the node 104.sub.4k, the voltage of the control line TRG(B) connected to the output terminal of the TRG driver 100.sub.4k is not affected by the voltage GND#1 of the node 104.sub.4k that increases by the IR drop.

The same applies in the case of the control line TRG(Gr) connected to the output terminal of the TRG driver 100.sub.4k-2 controlling the Gr pixel 60Gr and the control line TRG(Gb) connected to the output terminal of the TRG driver 100.sub.4k-1 controlling the Gb pixel 60Gb.

Thus, as the control line TRG(R) connected to the R pixels 60R temporarily transitions to the H level, the voltages of the control lines TRG(Gr), TRG(Gb), and TRG(B) of the other colors do not increase, and thus it is possible to prevent the accuracy of the illuminance data of each color from deteriorating as the voltages of the control lines TRG(Gr), TRG(Gb), and TRG(B) increase, and the charges accumulated in the Gr pixel 60Gr, the Gb pixel 60Br, and the B pixel 60B leak as described above with reference to FIG. 13.

Even when charges are transferred from the pixels 60 other than the R pixels, the TRG driver 100.sub.q performs the same process as when charges are transferred from the R pixel 60R.

In other words, when charges are transferred from the pixels 60 other than the R pixels, for example, the B pixels 60B, in the TRG driver 100.sub.4k, the control line TRG(R) connected to the transfer transistors 62 of the B pixels 60B temporarily transitions to the H level.

In other words, as illustrated in FIG. 16, in the driver control unit 111.sub.4k, the FET 101.sub.4k of the TRG driver 100.sub.4k controlling the B pixels 60B transitions from the off state to the on state and then transitions to the off state.

Further, the FET 102.sub.4k enters a state opposite to the state of the FET 101.sub.4k, and transitions from the on state to the off state and then transitions to the on state.

Further, the FET 103.sub.4k enters the off state.

Thus, when charges are transferred from the B pixels 60B, similarly to when charges are transferred from the R pixels 60R, first, the FET 101.sub.4k enters the off state, the FET 102.sub.4k enters the on state, and the FET 103.sub.4k enters the off state. In this case, since the output terminal of the TRG driver 100.sub.4k is connected to the node 104.sub.4k through the FET 102.sub.4k in the on state, the voltage of the control line TRG(B) connected to the output terminal of the TRG driver 100.sub.4k has the potential GND#1 of the node 104.sub.4k, that is, the L level.

Then, when charges are transferred from the B pixels 60B, the FET 101.sub.4k enters the on state, the FET 102.sub.4k enters the off state, and the FET 103.sub.4k enters the off state. In this case, since the output terminal of the TRG driver 100.sub.4k is connected to the power source VDD#1 through the FET 101.sub.4k in the on state, the voltage of the control line TRG(B) connected to the output terminal of the TRG driver 100.sub.4k transitions from the L level to the voltage VDD#1, that is, the H level.

Thereafter, when charges are transferred from the B pixels 60B, the FET 101.sub.4k enters the off state, the FET 102.sub.4k enters the on state, and the FET 103.sub.4k enters the off state. In this case, since the output terminal of the TRG driver 100.sub.4k is connected to the node 104.sub.4k through the FET 102.sub.4k in the on state, the voltage of the control line TRG(B) connected to the output terminal of the TRG driver 100.sub.4k transitions from the H level to the potential GND#1 of the node 104.sub.4k, that is, the L level.

As described above, when the voltage of the control line TRG(B) transitions from the H level to the L level (the potential GND#1 of the node 104.sub.4k), only the FET 102.sub.4k among the FETs 101.sub.4k to 103.sub.4k enters the on state, and in this case, as described above with reference to FIGS. 13 and 14, the charges of the gates of the transfer transistors 62 of the B pixels 60B connected to the control line TRG(B) flow to the node 104.sub.4k and the series circuit in which the plurality of resistors R are connected in series connected to the node 104.sub.4k through the control line TRG(B) and the FET 102.sub.4k in the on state.

As a result, IR drop occurs in the series circuit in which the plurality of resistors R are connected in series, and the voltages GND#1 of the node 104.sub.4k-3 of the TRG driver 100.sub.4k-3 controlling the R pixel 60R, the node 104.sub.4k-2 of the TRG driver 100.sub.4k-2 controlling the Gr pixel 60Gr, and the node 104.sub.4k-1 of the TRG driver 100.sub.4k-1 controlling the Gb pixel 60Gb as well as the voltages GND#1 of the node 104.sub.4k of the TRG driver 100.sub.4k controlling the B pixel 60B increase by the IR drop caused in the series circuit in which the plurality of resistors R are connected in series.

When charges are transferred from the B pixels 60B, in the TRG driver 100.sub.4k-3 controlling the pixels of a color other than B, for example, the R pixels 60R, the FET 101.sub.4k-3 enters the off state, the FET 102.sub.4k-3 enters the off state, and the FET 103.sub.4k-3 enters the on state under control of the driver control unit 111.sub.4k-3 as illustrated in FIG. 16.

As described above, when only the FET 103.sub.4k-3 among the FETs 101.sub.4k-3 to 103.sub.4k-3 enters the on state, the output terminal of the TRG driver 100.sub.4k-3 is connected to the node 105.sub.4k-3 through the FET 103.sub.4k-3 in the on state. Thus, the voltage of the control line TRG(R) connected to the output terminal of the TRG driver 100.sub.4k-3 has the potential GND#2 of the node 105.sub.4k-3, that is, the L level.

In other words, when charges are transferred from the B pixels 60B, similarly to when charges are transferred from the R pixels 60R, the voltage GND#1 of the node 104.sub.q (the nodes 104.sub.4k-3, 104.sub.4k-2, 104.sub.4k-1, and 104.sub.4k) increases by the IR drop caused by the series circuit in which the plurality of resistors R are connected in series, but since the output terminal of the TRG driver 100.sub.4k-3 controlling the R pixel 60R other than the B pixel 60B is connected to the node 105.sub.4k-3 other than the node 104.sub.4k-3, the voltage of the control line TRG(R) connected to the output terminal of the TRG driver 100.sub.4k-3 is not affected by the voltage GND#1 of the node 104.sub.4k-3 that increases by the IR drop.

The same applies in the case of the control line TRG(Gr) connected to the output terminal of the TRG driver 100.sub.4k-2 controlling the Gr pixel 60Gr and the control line TRG(Gb) connected to the output terminal of the TRG driver 100.sub.4k-1 controlling the Gb pixel 60Gb.

Thus, as the control line TRG(B) connected to the B pixels 60B temporarily transitions to the H level, the voltages of the control lines TRG(R), TRG(Gr), and TRG(Gb) of the other colors do not increase, and thus it is possible to prevent the accuracy of the illuminance data of each color from deteriorating as the voltages of the control lines TRG(R), TRG(Gr), and TRG(Gb) increase, and the charges accumulated in the R pixel 60R, the Gr pixel 60Gr, and the Gb pixel 60Br leak as described above with reference to FIG. 13.

As described above, in the pixel drive unit 21 illustrated in FIG. 15, the TRG driver 100.sub.q includes a plurality of nodes, for example, the nodes 104.sub.q and 105.sub.q (first and second paths to the GND) connecting the control line TRG connected to the output terminal thereof, that is, (the gate of) the transfer transistors 62 of the pixels 60 connected to the control line TRG with the GND.

Further, the TRG driver 100.sub.q' controlling the transfer transistors 62 such that charges are transferred among the TRG drivers 100.sub.q uses one of the two nodes 104.sub.q' and 105.sub.q', for example, the node 104.sub.q'. In other words, the TRG driver 100.sub.q' controlling the transfer transistors 62 such that charges are transferred connects the control line TRG with the node 104.sub.q' of the voltage GND#1 in order to cause the voltage the control line TRG connecting the output terminal thereof with (the gate of) the transfer transistor 62 to have the L level.

Further, the TRG driver 100.sub.q" not controlling the transfer transistors 62 such that charges are transferred among the TRG drivers 100.sub.q uses one of the two nodes 104.sub.q" and 105.sub.q", for example, the node 105.sub.q". In other words, the TRG driver 100.sub.q" not controlling the transfer transistors 62 such that charges are transferred connects the control line TRG connecting the output terminal thereof with (the gate of) the transfer transistor 62 with the node 105.sub.q", and causes the voltage of the control line TRG to have the voltage GND#2 of the node 105.sub.q", that is, the L level.

As a result, even when the voltage GND#1 of the node 104.sub.q' (and 104.sub.q") increases due to the IR drop, there is no influence on the control line TRG connected to the node 105.sub.q" of the voltage GND#2 or the transfer transistors 62 connected to the control line TRG, and in the pixels 60 including the transfer transistors 62 controlled by the TRG driver 100.sub.q" not controlling the transfer transistors 62 such that charges are transferred, charges do not leak as described above with reference to FIG. 13.

Thus, it is possible to prevent the accuracy of the illuminance data of each color from deteriorating as charges leak as described above with reference to FIG. 13.

Figure 17:
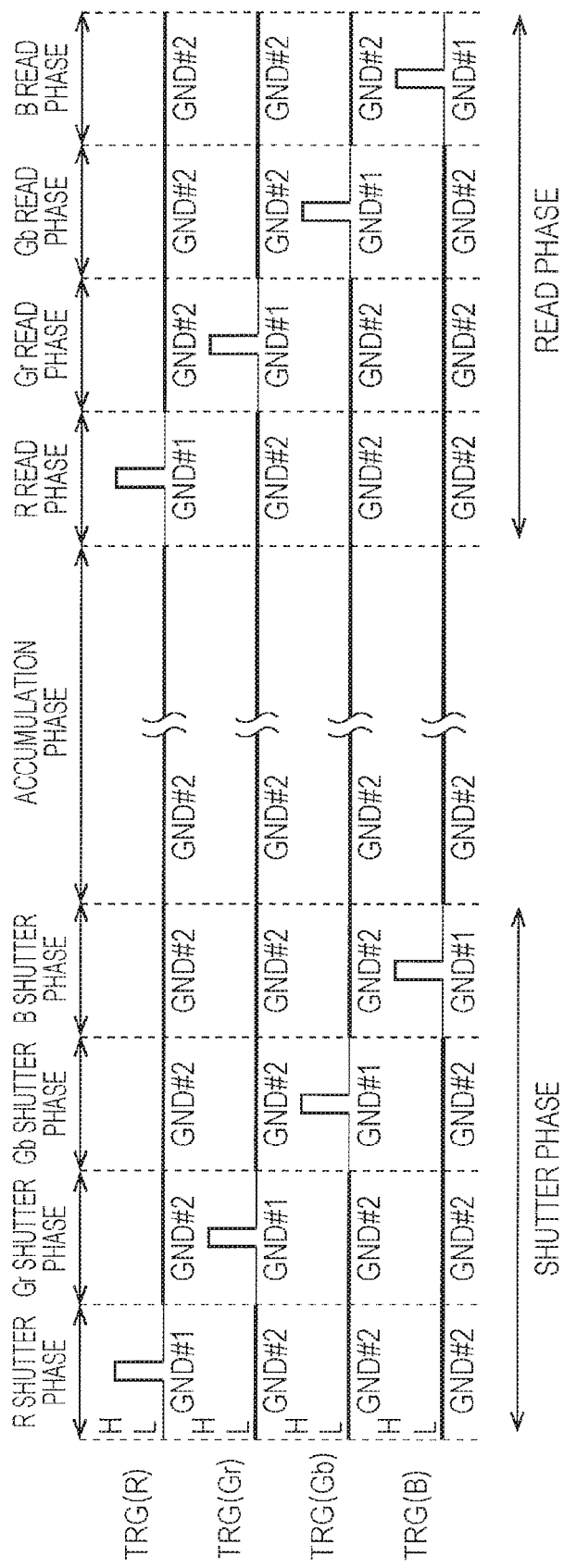
FIG. 17 is a timing chart illustrating a voltage of a control line TRG controlled by a TRG driver 100.sub.q when illuminance data of each color is obtained in an illuminometer mode.

FIG. 17 is a timing chart illustrating the voltage (the control signal TRG) of the control line TRG controlled by the TRG driver 100.sub.q of FIG. 15 when the illuminance data of each color is obtained in the illuminometer mode.

As described above with reference to FIG. 7, when illuminance data of each color is obtained, the control line TRG(R), the control line TRG(Gr), the control line TRG (Gb), and the control line TRG(B) temporarily transition from the L level to the H level, and the B shutter phase and the B read phase in the R shutter phase and the R read phase, the Gr shutter phase and the Gr read phase, and the Gb shutter phase and the Gb read phase, respectively, and charges accumulated in the pixels 60 of each color of R, Gr, Gb, and B are sequentially transferred.

For example, in the case in which charges are transferred from the R pixels 60R, when (the voltage of) the control line TRG(R) transitions to the L level, in the TRG driver 100.sub.4k-3, the control line TRG(R) is connected to the node 104.sub.4k-3, and transitions to the voltage GND#1 of the node 104.sub.4k-3.

Meanwhile, in the TRG drivers 100.sub.4k-2, 100.sub.4k-1, and 100.sub.4k, the other control lines TRG (Gr), TRG(Gb), and TRG(B) are connected to the nodes 105.sub.4k-2, 105.sub.4k-1, and 105.sub.4k, and transition to the voltage GND#2 of the nodes 105.sub.4k-2, 105.sub.4k-1, and 105.sub.4k.

In the case in which charges are transferred from the R pixels 60R, when the control line TRG(R) temporarily transitions to the H level and then transitions from the H level to the L level, even when the IR drop described above with reference to FIG. 13 occurs, the IR drop does not affect the voltages of the other control lines TRG(Gr), TRG(Gb), and TRG(B) connected to the nodes 105.sub.4k-2, 105.sub.4k-1, and 105.sub.4k of the voltage GND#2.

The same applies even when charges are transferred the Gr, Gb, or Gr pixels 60.

As described above, the TRG driver 100.sub.q' controlling the transfer transistors 62 such that charges are transferred and the TRG driver 100.sub.q" not controlling the transfer transistors 62 such that charges are transferred use different types of GNDs such as the node 104.sub.q' connected with the GND through the series circuit in which the plurality of resistors R are connected in series and the node 105.sub.q" connected with the GND through the series circuit in which the plurality of resistors R' are connected in series, and thus even when the voltage GND#1 of the node 104.sub.q' (and 104.sub.q") increases due to the IR drop, the IR drop does not affect the control line TRG connected to the node 105.sub.q" of the voltage GND#2 or the transfer transistor 62 connected to the corresponding control line TRG.

Thus, it is possible to prevent the accuracy of the illuminance data of each color from deteriorating as charges accumulated in the PD 61 leak through the transfer transistor 62 as described above with reference to FIG. 13.

Further, for the pixel drive unit 21 illustrated in FIG. 13, it is necessary to design the GND that causes the IR drop to be as small as possible, for example, but for the pixel drive unit 21 illustrated in FIG. 15, it is possible to design the GND (easily) without giving special consideration to the IR drop.

[Another Exemplary Configuration of Pixel Unit 11.Sub.m,n]

Figure 18:
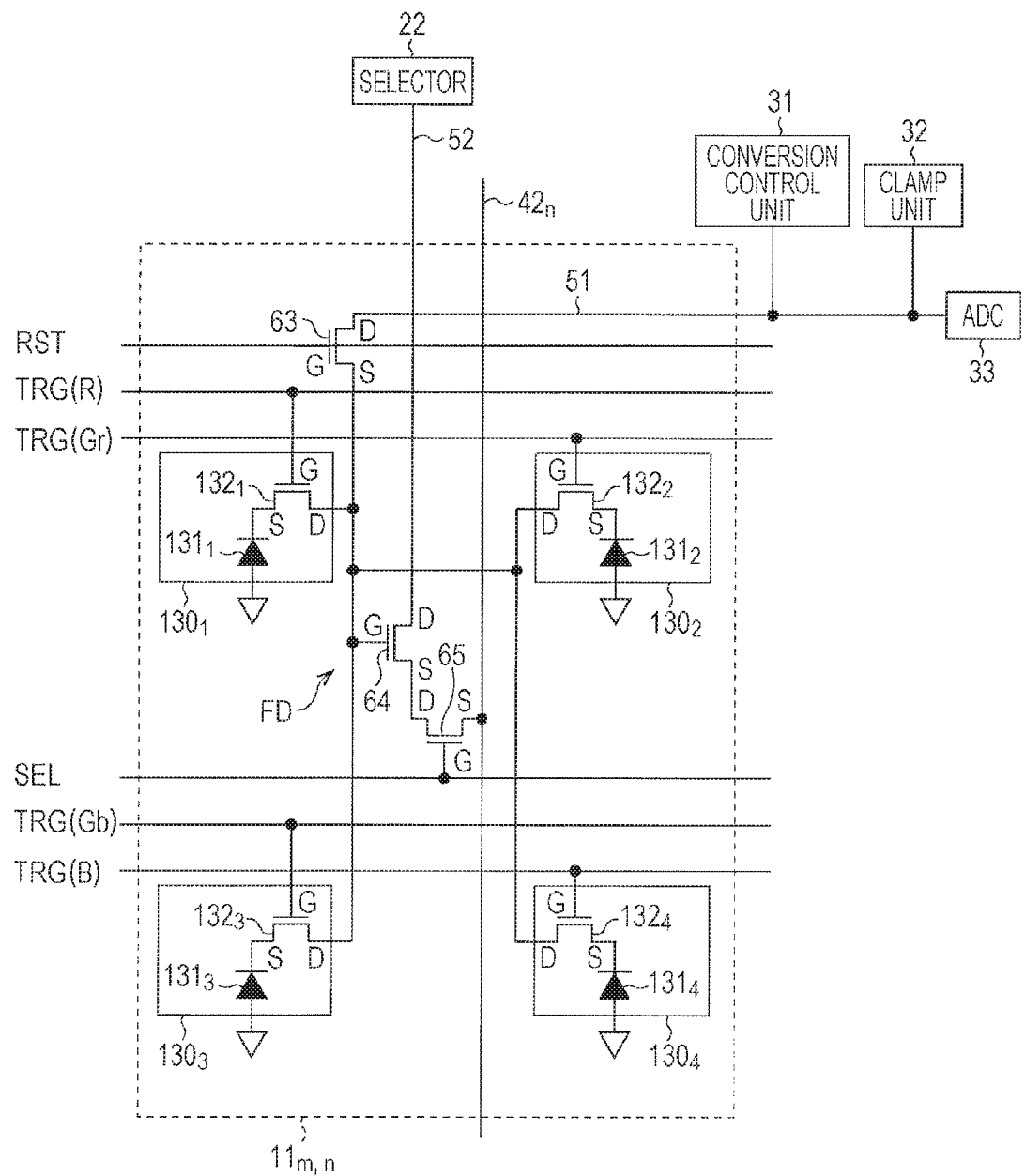
FIG. 18 is a circuit diagram illustrating another exemplary configuration of the pixel unit of FIG. 1.

FIG. 18 is a circuit diagram illustrating another exemplary configuration of the pixel unit 11.sub.m,n illustrated in FIG. 1.

In FIG. 18, components corresponding to those illustrated in FIG. 2 are denoted by the same reference numerals, and a description thereof will be omitted as necessary.

Referring to FIG. 18, the pixel unit 11.sub.m,n is the same as that of FIG. 2 in that a reset transistor 63, an amplifying transistor 64, and a selecting transistor 65 are provided.

However, the pixel unit 11.sub.m,n of FIG. 18 differs from that of FIG. 2 in that the pixel unit 11.sub.m,n includes a plurality of pixels, for example, four pixels 130.sub.1, 130.sub.2, 130.sub.3, and 130.sub.4 instead of one pixel 60.

In other words, the pixel unit 11.sub.m,n of FIG. 18 differs from that of FIG. 2 in which one pixel 60 uses the reset transistor 63, the amplifying transistor 64, and the selecting transistor 65 in that a shared pixel configuration in which a plurality of pixels, for example, the four pixels 130.sub.1 to 130.sub.4 share the reset transistor 63, the amplifying transistor 64, and the selecting transistor 65 is employed.

Referring to FIG. 18, the four pixels 130.sub.1 to 130.sub.4 are arranged in the form of a 2.times.2 matrix. In other words, the pixel 130.sub.1 is arranged on the upper left of the 2.times.2 matrix, the pixel 130.sub.2 is arranged on the upper right of the 2.times.2 matrix, the pixel 130.sub.3 is arranged on the lower left of the 2.times.2 matrix, and the pixel 130.sub.4 is arranged on the lower right of the 2.times.2 matrix.

For example, the pixel 130.sub.1 is an R pixel receiving light of R in the Bayer array, and the pixel 130.sub.2 is a Gr pixel receiving light of Gr in the Bayer array. Further, for example, the pixel 130.sub.3 is a Gb pixel receiving light of Gb in the Bayer array, and the pixel 130.sub.4 is a B pixel receiving light of B in the Bayer array.

The pixel 130.sub.i (i=1, 2, 3, and 4) includes a PD 131.sub.i and a transfer transistor 132.sub.i, similarly to the pixel 60 of FIG. 2.

Here, the pixel control line 41.sub.m connected to the pixel drive unit 21 (FIG. 1) includes a control line RST for controlling the reset transistor 63, a control line SEL for controlling the selecting transistor 65, and a control line TRG for controlling the transfer transistor 132.sub.i.

The control line RST is connected to a gate of the reset transistor 63, and the control line SEL is connected to a gate of the selecting transistor 65. The control line TRG is connected to a gate of the transfer transistor 132.sub.i.

As the control line TRG, there are a control line TRG(R) connected to the transfer transistor 132.sub.1 of the R pixel 130.sub.1, a control line TRG(Gr) connected to the transfer transistor 132.sub.2 of the Gr pixel 130.sub.2, a control line TRG(Gb) connected to the transfer transistor 132.sub.3 of the Gb pixel 130.sub.3, and a control line TRG(B) connected to the transfer transistor 132.sub.4 of the B pixel 130.sub.4.

In the pixel 130.sub.i, an anode of the PD 131.sub.i is connected to the GND, and a cathode thereof is connected to a source of the transfer transistor 132.sub.i.

The transfer transistor 132.sub.i is an nMOS FET, and a drain thereof is connected to a connection point of a source of the reset transistor 63 and a gate of the amplifying transistor 64.

In the pixel unit 11.sub.m,n having the above configuration, the pixel 130.sub.i, the PD 131.sub.i receives light of a color incident thereon, performs photoelectric conversion, and accumulates charges according to a quantity of received light.

In the imaging mode, the same process as described above with reference to FIG. 3 is performed.

In other words, in the photographing mode, the H level is temporarily applied to the gate of the reset transistor 63 through the control line RST, and the reset transistor 63 temporarily enters the on state. Thus, before charges are transferred from the PD 131.sub.i to the FD (the connection point of the drain of the transfer transistor 132.sub.i and the gate of the amplifying transistor 64), a reset operation of sweeping charges present in the FD out to the power source VDD#1 through the reset transistor 63 and the power line 51 is performed.

Thereafter, the H level is temporarily applied, for example, to the gate of the transfer transistor 132.sub.1 of the R pixel 130.sub.1 among the transfer transistors 132.sub.1 to 132.sub.4 through the control line TRG(R), and the transfer transistor 132.sub.1 temporarily enters the on state.

As a result, charges accumulated in the PD 131.sub.1 are transferred to the FD through the transfer transistor 132.sub.1.

Meanwhile, the amplifying transistor 64 outputs a voltage corresponding to the potential of the FD immediately after the reset operation to the source thereof as a reset level, and then outputs a voltage corresponding to the potential of the FD immediately after the charges are transferred from the PD 131.sub.1 to the source thereof as a voltage (signal level) corresponding to a pixel value based on the reset level.

The reset level and the signal level output to the source of the amplifying transistor 64 are output the vertical signal line 42.sub.n through the selecting transistor 65.

The reset level and the signal level output to the vertical signal line 42.sub.n are supplied to the ADC 24.sub.n. The ADC 24.sub.n performs the CDS and the AD conversion on the signal level using the reset level, and outputs digital data obtained as a result of performing the CDS and the AD conversion on the signal level as pixel data of the R pixel 130.sub.1.

Thereafter, the reset transistor 63 temporarily enters the on state again, and the reset operation of sweeping the charges present in the FD out to the power source VDD#1 through the reset transistor 63 and the power line 51 is performed.

Then, the H level is temporarily applied, for example, to the gate of the transfer transistor 132.sub.2 of the Gr pixel 130.sub.2 among the transfer transistors 132.sub.1 to 132.sub.4 through the control line TRG(Gr), and the transfer transistor 132.sub.1 temporarily enters the on state.

As a result, charges accumulated in the PD 131.sub.2 are transferred to the FD through the transfer transistor 132.sub.2.

The amplifying transistor 64 outputs a voltage corresponding to the potential of the FD immediately after the reset operation to the source thereof as a reset level, and then outputs a voltage corresponding to the potential of the FD immediately after the charges are transferred from the PD 131.sub.2 to the source thereof as a signal level corresponding to a pixel value based on the reset level.

The reset level and the signal level output to the source of the amplifying transistor 64 are output the vertical signal line 42.sub.n through the selecting transistor 65.

The reset level and the signal level output to the vertical signal line 42.sub.n are supplied to the ADC 24.sub.n. The ADC 24.sub.n performs the CDS and the AD conversion on the signal level using the reset level, and outputs digital data obtained as a result of performing the CDS and the AD conversion on the signal level as pixel data of the Gr pixel 130.sub.2.

Thereafter, the same process is performed on the Gb pixel 130.sub.3 and the B pixel 130.sub.4, and thus the ADC 24.sub.n outputs pixel data of the pixels 130.sub.1 to 130.sub.4 included in the pixel unit 11.sub.m,n chronologically (in a time-division manner).

Meanwhile, in the illuminometer mode, the same process as described above with reference to FIG. 4 is performed.

In other words, in the illuminometer mode, the control signals RST and SEL constantly have the H level, and thus the reset transistor 63 and the selecting transistor 65 are constantly in the on state.

Further, in the shutter phase, the control line TRG(R) connected to, for example, the transfer transistor 132.sub.1 of the R pixel 130.sub.1 among the pixel 130.sub.1 to 130.sub.4 temporarily transitions to the H level, and the transfer transistor 132.sub.1 temporarily enters the on state.

In the illuminometer mode, the reset transistor 63 is constantly in the on state, and thus when the transfer transistor 132.sub.1 enters the on state, charges accumulated in the PD 131.sub.1 of the R pixel 130.sub.1 are swept out to (the power source VDD#2 of) the conversion control unit 31 (FIG. 5) through the transfer transistor 132.sub.1, the reset transistor 63, and the power line 51, and the PD 131.sub.1 is reset.

Then, the voltage of the power line 51 when the PD 131.sub.1 is reset is supplied to the ADC 33 connected to the power line 51 as the reset level.

Thereafter, again, in the read phase, the control line TRG(R) connected to the transfer transistor 132.sub.1 of the pixel 130.sub.1 temporarily transitions to the H level, and the transfer transistor 132.sub.1 temporarily enters the on state.

Further, the conversion control unit 31 causes the power line 51 to enter the floating state immediately before the transfer transistor 132.sub.1 enters the on state again.

After the power line 51 enters the floating state, when the transfer transistor 132.sub.1 enters the on state, the charges accumulated in the PD 131.sub.1 flow to the power line 51 through the transfer transistor 132.sub.1 and the reset transistor 63 and are converted into a corresponding voltage.

As a result, a voltage corresponding to the charges accumulated in the PD 131.sub.1 is supplied to the ADC 33 connected to the power line 51 as a voltage (signal level) corresponding to illuminance based on the reset level.

The ADC 33 performs the CDS and the AD conversion on the signal level supplied through the power line 51 using the reset level supplied through the power line 51, and outputs digital data obtained as a result of performing the CDS and the AD conversion on the signal level as illuminance data of light of R received by the pixel 130.sub.1.

In the illuminometer mode, at another timing (in the Gr shutter phase) of the shutter phase, the control line TRG(Gr) connected to the transfer transistor 132.sub.2 of the Gr pixel 130.sub.2 temporarily transitions to the H level, and the transfer transistor 132.sub.2 temporarily enters the on state.

In the illuminometer mode, the reset transistor 63 is constantly in the on state, and thus when the transfer transistor 132.sub.2 enters the on state, charges accumulated in the PD 131.sub.2 of the Gr pixel 130.sub.2 are swept out to (the power source VDD#2 of) the conversion control unit 31 (FIG. 5) through the transfer transistor 132.sub.2, the reset transistor 63, and the power line 51, and the PD 131.sub.2 is reset.

Then, the voltage of the power line 51 when the PD 131.sub.1 is reset is supplied to the ADC 33 connected to the power line 51 as the reset level.

Thereafter, at another timing (in the Gr read phase) of the read phase, again, the control line TRG(Gr) connected to the transfer transistor 132.sub.2 of the pixel 130.sub.2 temporarily transitions to the H level, and the transfer transistor 132.sub.2 temporarily enters the on state.

Further, the conversion control unit 31 causes the power line 51 to enter the floating state immediately before the transfer transistor 132.sub.2 enters the on state again.

After the power line 51 enters the floating state, when the transfer transistor 132.sub.2 enters the on state, the charges accumulated in the PD 131.sub.2 flow to the power line 51 through the transfer transistor 132.sub.2 and the reset transistor 63 and are converted into a corresponding voltage.

As a result, a voltage corresponding to the charges accumulated in the PD 131.sub.2 is supplied to the ADC 33 connected to the power line 51 as a signal level corresponding to illuminance based on the reset level.

The ADC 33 performs the CDS and the AD conversion on the signal level supplied through the power line 51 using the reset level supplied through the power line 51, and outputs digital data obtained as a result of performing the CDS and the AD conversion on the signal level as illuminance data of light of Gr received by the pixel 130.sub.2.

In the illuminometer mode, the control line TRG(Gb) connected to the transfer transistor 132.sub.3 of the Gb pixel 130.sub.3 and the control line TRG(B) connected to the transfer transistor 132.sub.4 of the B pixel 130.sub.4 temporarily transition to the H level at different timings, and thus the ADC 33 acquires illuminance data of light of Gb received by the pixel 130.sub.3 and illuminance data of light of B received by the pixel 130.sub.4.

As described above, the transfer transistors 132.sub.i for transferring the charges accumulated in the PDs 131.sub.i are controlled for each color of R, Gr, Gb, and B and temporarily enter the on state at different timings, and thus illuminance data of each color of R, Gr, Gb, and B can be obtained.

In other words, even when the pixel unit 11.sub.m,n employs the shared pixel configuration, it is possible to obtain illuminance data of each color, similarly to the pixel unit 11.sub.m,n including one pixel 60 illustrated in FIG. 2.

Thus, in the image sensor, regardless of whether or not pixels of a plurality of colors are shared, it is possible to measure illuminance. Further, it is unnecessary to add a circuit used to measure illuminance of each color to a pixel in order to measure illuminance of each color.

Further, in FIG. 18, it is possible to acquire illuminance data independent of a color by causing the transfer transistor 132.sub.i for transferring the charges accumulated in the PDs 131.sub.i to temporarily enter the on state at the same time regardless of colors of R, Gr, Gb, and B. Furthermore, in FIG. 18, the pixel unit 11.sub.m,n has the shared pixel configuration of 2.times.2 pixels (the pixel 130.sub.1 to 130.sub.4), but the present technology can be applied to a pixel unit with a 4-transistor configuration in which an arbitrarily number of pixels such as 2.times.4 pixels are shared, and a transfer transistor, a reset transistor, an amplifying transistor, and a selecting transistor are provided.

[Description of Computer to which Present Technology is Applied]

Next, simulation of the image sensor can be performed on a computer.

In order to perform simulation of the image sensor on a computer, a simulation program for causing the computer to function as the image sensor, that is, the pixel array 10, the pixel drive unit 21, the selectors 22 and 23, the ADCs 24.sub.1 to 24.sub.N, the conversion control unit 31, the clamp unit 32, and the ADC 33 is installed in the computer.

FIG. 19 illustrates an exemplary configuration of an embodiment of a computer in which a simulation program is installed.

The program may be recorded in a hard disk 205 or a ROM 203 that is a recording medium equipped in the computer in advance.

Alternatively, the program may be stored (recorded) in a removable recording medium 211. The removable recording medium 211 may be provided as so-called package software. Here, examples of the removable recording medium 211 include a flexible disk, a compact disc read only memory (CD-ROM), a magneto optical (MO) disk, a digital versatile disc (DVD), a magnetic disk, and a semiconductor memory.

The program may be downloaded to the computer via a communication network or a broadcasting network and installed in the internal hard disk 205 instead of being installed in the computer from the removable recording medium 211. In other words, for example, the program may be wirelessly transferred from a download site to the computer through a satellite for digital satellite broadcasting or may be transferred to the computer via a network such as a local area network (LAN) or the Internet in a wired manner.

The computer includes a central processing unit (CPU) 202, and an I/O interface 210 is connected to the CPU 202 via a bus 201.

When the user operates an input unit 207 through the I/O interface 210 and inputs a command, the CPU 202 executes a program stored in a read only memory (ROM) 203. Alternatively, the CPU 202 loads a program stored in the hard disk 205 onto a random access memory (RAM) 204, and executes the program.

Thus, the CPU 202 performs a processing according to the above-described flowchart or a process according to the configuration of the above-described block diagram. Further, the CPU 202 performs, for example, an output of the processing result from an output unit 206, transmission of the processing result from a communication unit 208, or recording of the processing result in the hard disk 205 through the I/O interface 210 as necessary.

The input unit 207 is configured with a keyboard, a mouse, a microphone, or the like. The output unit 206 is configured with a liquid crystal display (LCD), a speaker, or the like.

Here, in this disclosure, processes performed by the computer according to a program need not be performed chronologically according to an order described as a flowchart. In other words, the processes performed by the computer according to the program also include processes (for example, a parallel process or a process by an object) performed in parallel or individually.

The program may be processed in a single computer (processor) or may be distributedly processed by a plurality of computers. Further, the program may be transferred to and executed by a computer at a remote side.

An embodiment of the present technology is not limited to the above embodiments, and various changes can be made within a scope not departing from the gist of the present technology.

For example, the present embodiment has been described in connection with the example in which only one ADC 33 is provided as an ADC for acquiring illuminance data, but as an ADC for acquiring illuminance data, a plurality of ADCs such as an ADC connected with R pixels, an ADC connected with G (either or both of Gr and Gb) pixels, and an ADC connected with B pixels may be provided. For example, when three ADCs, that is, an ADC connected with R pixels, an ADC connected with G pixels, and an ADC connected with B pixels are provided, it is possible to simultaneously obtain illuminance data of respective colors of R, G, and B.

Here, when many ADCs are provided as an ADC for acquiring illuminance data, a device size increases; and power consumption when illuminance data is obtained increases, and thus it is desirable that the number of ADCs for acquiring illuminance data is small in terms of the device size and the power consumption. In the image sensor (FIG. 1) according to the present embodiment, only one ADC 33 is provided as an ADC for acquiring illuminance data, and the ADC 33 receives (an addition value of) signals corresponding to light received by all (open) pixels 60 configuring the pixel array 10, and performs AD conversion on (the addition value of) the signals. Thus, the image sensor according to the present embodiment includes a circuit that can read signals of all (open) pixels of the image sensor through single AD conversion.

Further, for example, the pixel unit 11.sub.m,n may not include the selecting transistor 65.

Further, the present technology may have the following configurations.

[1]

An image sensor, including:

a plurality of pixel units each of which includes a pixel and a reset transistor, wherein the pixel includes a photoelectric converting unit that performs photoelectric conversion on light of a certain color incident through a color filter and a transfer transistor that transfers charges obtained by the photoelectric conversion of the photoelectric converting unit and is controllable for each color, the reset transistor is connected to an analog to digital (AD) converting unit that performs AD conversion, and resets the charges, and according to control of the transfer transistor, the charges are read from the photoelectric converting unit through the transfer transistor and the reset transistor, and a voltage corresponding to the charges is supplied to the AD converting unit connected to the reset transistor.

[2]

The image sensor according to [1], wherein as the transfer transistor is controlled for each color, the voltage corresponding to the charges is supplied to the AD converting unit for the each color.

[3]

The image sensor according to [1] or [2], wherein the AD converting unit is connected to a power line that connects a drain of the reset transistor with a power source, and the image sensor further includes a conversion control unit that causes the power line to enter a floating state, causes the charges to flow to the power line in the floating state through the reset transistor, converts the charges to a voltage, and supplies the voltage to the AD converting unit connected to the power line.

[4]

The image sensor according to [3], further including:

a driver that controls the transfer transistor such that the charges are transferred from the photoelectric converting unit; and a plurality of nodes that connect a gate of the transfer transistor to a GND, wherein a driver controlling the transfer transistor such that the charges are transferred uses one of the plurality of nodes, and a driver not controlling the transfer transistor such that the charges are transferred uses another of the plurality of nodes.

[5]

The image sensor according to [3] or [4], wherein the conversion control unit includes a step-down unit that generates a stepped-down voltage obtained by stepping down a voltage of the power source, and the conversion control unit applies the stepped-down voltage to the power line connected with the reset transistor in the on state, and then causes the power line to enter the floating state.

[6]

The image sensor according to [5], further including, a clamp unit that clamps the power line to a certain voltage lower than the stepped-down voltage.

[7]
The image sensor according to any of [1] to [6], wherein the pixel unit includes a plurality of pixels, and the reset transistor is shared by the plurality of pixels.

[8]
A control method for an image sensor including a plurality of pixel units each of which includes a pixel and a reset transistor, wherein the pixel includes a photoelectric converting unit that performs photoelectric conversion on light of a certain color incident through a color filter and a transfer transistor that transfers charges obtained by the photoelectric conversion of the photoelectric converting unit and is controllable for each color, and the reset transistor is connected to an analog to digital (AD) converting unit that performs AD conversion, and resets the charges, the control method including:

reading the charges from the photoelectric converting unit through the transfer transistor and the reset transistor and supplying a voltage corresponding to the charges to the AD converting unit connected to the reset transistor, according to control of the transfer transistor.

REFERENCE SIGNS LIST

10 Pixel array
$11_{1,1}$ to $11_{M,N}$ Pixel unit
21 Pixel drive unit
22, 23 Selector
$24_1$ $24_N$ ADC
31 Conversion control unit
32 Clamp unit
33 ADC
$41_1$ to $41_M$ Pixel control line
$42_1$ to $42_N$ Vertical signal line
51, 52 Power line
60 Pixel
61 PD
62 Transfer transistor
63 Reset transistor
64 Amplifying transistor
65 Selecting transistor
70 Switch unit
71 Inverter
72 FET
73 Voltage step-down unit
81 FET
$90_1$ to $90_{2M}$ TRG driver
$91_1$ to $91_{2M}$, $92_1$, to $92_{2M}$ FET
$93_1$ to $93_{2M}$ Node
$96_1$ to $96_{2M}$ Driver control unit
$100_1$ to $100_{2M}$ TRG driver
$101_1$ to $101_{2M}$, $102_1$ to $102_{2M}$, $103_1$ to $103_{2M}$ FET
$104_1$ to $104_{2M}$, $105_1$ to $105_{2M}$ Node
$111_1$ to $111_{2M}$ Driver control unit
$130_1$ to $130_4$ Pixel
$131_1$ to $131_4$ PD
$132_1$ to $132_4$ Transfer transistor
201 Bus
202 PU
203 ROM
204 RAM
205 Hard disk
206 Output unit
207 Input unit
208 Communication unit
209 Drive
210 I/O interface
211 Removable recording medium

The invention claimed is:

1. An image sensor comprising:
   a pixel including:
      a photoelectric converting unit,
      a floating diffusion coupled to the photoelectric converting unit,
      a reset transistor coupled to the floating diffusion, and
      an amplification transistor coupled to the floating diffusion;
   a signal line coupled to the amplification transistor;
   a first analog to digital converting unit coupled to a first terminal of the reset transistor via a power line;
   a clamp unit configured to clamp the power line to a predetermined voltage; and
   a second analog to digital converting unit coupled to the signal line.

2. The image sensor according to claim 1, further comprising a transfer transistor coupled to the floating diffusion and the photoelectric converting unit.

3. The image sensor according to claim 2, wherein as the transfer transistor is controlled, a voltage corresponding to charges obtained by photoelectric conversion of the photoelectric converting unit is supplied to the first analog to digital converting unit.

4. The image sensor according to claim 2, further comprising:
   a driver configured to control the transfer transistor such that charges obtained by photoelectric conversion of the photoelectric converting unit are transferred from the photoelectric converting unit; and
   a node that connects a gate of the transfer transistor to a ground, wherein
   the driver is configured to control the transfer transistor such that the charges are transferred via the node.

5. The image sensor according to claim 1, further comprising:
   a power source coupled to the first terminal of the reset transistor through a conversion control unit, wherein
   the conversion control unit includes a step-down unit that generates a stepped-down voltage obtained by stepping down a voltage of the power source, and
   the conversion control unit is configured to apply the stepped-down voltage to the power line in an on state of the reset transistor, and then to cause the power line to enter a floating state.

6. The image sensor according to claim 5,
   wherein the predetermined voltage is lower than the stepped-down voltage.

7. The image sensor according to claim 1, wherein the image sensor includes a plurality of pixels, and the reset transistor is shared by the plurality of pixels.

8. A control method for an image sensor including a pixel having a photoelectric converting unit, a floating diffusion coupled to the photoelectric converting unit, a reset transistor coupled to the floating diffusion, and an amplification coupled to the floating diffusion; and a signal line coupled to the amplification transistor; the method comprising:
   performing a first analog to digital conversion by a first analog to digital converting unit coupled to a first terminal of the reset transistor via a power line;

clamping the power line to a predetermined voltage; and
performing a second analog to digital conversion by a second analog to digital converting unit coupled to the signal line.

9. The control method according to claim 8, wherein the pixel further comprises a transfer transistor coupled to the floating diffusion and the photoelectric converting unit.

10. The control method according to claim 9, further comprising:
controlling the transfer transistor; and
as the transfer transistor is controlled, supplying a voltage corresponding to charges obtained by photoelectric conversion of the photoelectric converting unit to the first analog to digital converting unit.

11. The control method according to claim 9, further comprising:
controlling, via a driver, the transfer transistor such that charges obtained by photoelectric conversion of the photoelectric converting unit are transferred from the photoelectric converting unit, wherein
the pixel further comprises a node that connects a gate of the transfer transistor to a ground, and the driver is configured to control the transfer transistor such that the charges are transferred via the node.

12. The control method according to claim 8, the pixel further including a power source coupled to the first terminal of the reset transistor through a conversion control unit, the method further comprising:
generating, via a step-down unit of the conversion control unit, a stepped-down voltage obtained by stepping down a voltage of the power source, and
applying, via the conversion control unit, the stepped-down voltage to the power line in an on state of the reset transistor, and then causing the power line to enter a floating state.

13. The control method according to claim 12,
wherein the predetermined voltage is lower than the stepped-down voltage.

14. The control method according to claim 8, wherein the image sensor includes a plurality of pixels, and the reset transistor is shared by the plurality of pixels.

15. A non-transitory computer-readable medium storing a program that, when executed by a computer, causes the computer to perform control operations for an image sensor including a pixel having a photoelectric converting unit, a floating diffusion coupled to the photoelectric converting unit, a reset transistor coupled to the floating diffusion, and an amplification coupled to the floating diffusion; and a signal line coupled to the amplification transistor; the operations comprising:
performing a first analog to digital conversion by a first analog to digital converting unit coupled to a first terminal of the reset transistor via a power line;
clamping the power line to a predetermined voltage; and
performing a second analog to digital conversion by a second analog to digital converting unit coupled to the signal line.

16. The non-transitory computer-readable medium according to claim 15, wherein the pixel further comprises a transfer transistor coupled to the floating diffusion and the photoelectric converting unit.

17. The non-transitory computer-readable medium according to claim 16, the operations further comprising:
controlling the transfer transistor; and
as the transfer transistor is controlled, supplying a voltage corresponding to charges obtained by photoelectric conversion of the photoelectric converting unit to the first analog to digital converting unit.

18. The non-transitory computer-readable medium according to claim 16, the operations further comprising:
controlling, via a driver, the transfer transistor such that charges obtained by photoelectric conversion of the photoelectric converting unit are transferred from the photoelectric converting unit, wherein
the pixel further comprises a node that connects a gate of the transfer transistor to a ground, and the driver is configured to control the transfer transistor such that the charges are transferred via the node.

19. The non-transitory computer-readable medium according to claim 15, the pixel further including a power source coupled to the first terminal of the reset transistor through a conversion control unit, the operations further comprising:
generating, via a step-down unit of the conversion control unit, a stepped-down voltage obtained by stepping down a voltage of the power source, and
applying, via the conversion control unit, the stepped-down voltage to the power line in an on state of the reset transistor, and then causing the power line to enter a floating state.

20. The non-transitory computer-readable medium according to claim 19,
wherein the predetermined voltage is lower than the stepped-down voltage.

* * * * *